United States Patent
Wu et al.

(10) Patent No.: US 8,392,324 B2
(45) Date of Patent: Mar. 5, 2013

(54) METHOD AND SYSTEM FOR CHARGING CORRELATION

(75) Inventors: Yajuan Wu, Shenzhen (CN); Long Luo, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 433 days.

(21) Appl. No.: 12/241,486

(22) Filed: Sep. 30, 2008

(65) Prior Publication Data

US 2009/0089208 A1  Apr. 2, 2009

Related U.S. Application Data

(63) Continuation of application No. PCT/CN2007/001048, filed on Mar. 30, 2007.

(30) Foreign Application Priority Data

Mar. 31, 2006 (CN) .......................... 2006 1 0067080

(51) Int. Cl.
*G06Q 40/00* (2012.01)
(52) U.S. Cl. ......................................... 705/39; 379/126
(58) Field of Classification Search .................. 705/39; 379/126
See application file for complete search history.

(56) References Cited

U.S. PATENT DOCUMENTS

| | | | |
|---|---|---|---|
| 2003/0096592 A1 | 5/2003 | Moreau et al. | |
| 2004/0255025 A1 | 12/2004 | Ricagni | |
| 2005/0026558 A1 | 2/2005 | Stura et al. | |

FOREIGN PATENT DOCUMENTS

| | | |
|---|---|---|
| CN | 1267414 | 9/2000 |
| CN | 1473443 A | 2/2004 |
| CN | 1643888 | 7/2005 |
| EP | 1315352 | 5/2003 |
| WO | WO-0237870 | 5/2002 |

OTHER PUBLICATIONS

Communication from European Patent Office issued in corresponding European Patent Application No. 07720622.5, mailed Apr. 15, 2010.
Office Action issued in corresponding Chinese Patent Application No. 200610067080.8; issued Mar. 18, 2010.
Office Action issued in corresponding European Patent Application No. 07 720 622.5; issued Apr. 15, 2010.

*Primary Examiner* — Daniel Felten
(74) *Attorney, Agent, or Firm* — Brinks Hofer Gilson & Lione

(57) ABSTRACT

A charging correlation method for an application or service is provided. The method may include: receiving a service identifier assigned for an application or service; and correlating Charging Data Records CDRs generated for the application or service based on the service identifier. A charging correlation system, a billing center and an apparatus are also provided. These method and apparatus may provide a simple charging correlation process for an application or service.

10 Claims, 16 Drawing Sheets

METHOD AND SYSTEM FOR CHARGING CORRELATION

CROSS REFERENCE TO RELATED APPLICATIONS

The present application is a continuation of International Application No. PCT/CN2007/001048, filed on Mar. 30, 2007, which claims the benefit of Chinese Patent Application No. 200610067080.8, filed on Mar. 31, 2006, both of which are herein incorporated by reference in their entireties.

FIELD OF THE INVENTION

The present invention relates to application or services, and particularly, to a method and system for charging correlation of application or services, a billing center and a charging data record generating apparatus.

BACKGROUND OF THE INVENTION

At present, communication systems provide application or services for individual users and/or group users, and communication media employed in these services may include text, audio, video, and varieties combinations of multimedia. An ordinary application or service is mainly oriented to individuals, and usually there is only one or two User Equipments (UEs) communicate with each other in such an application or service. However, in an application or service in which group users take part, users of one or more groups usually communicate with other users simultaneously. In other words, this kind of communication is not a two-party communication including one calling user and one called user, but a communication including a plurality of calling users and a plurality of called users. Such an application or service in which group users take part is also called a multi-party service.

In a session-based service, a Charging Identifier (CID) is allocated each time when an Application Server (AS) establishes a session with a UE, and all CIDs allocated are saved in the AS and a service bearer network. A billing center obtains Charging Data Records (CDRs) corresponding to the CIDs from the service bearer network and the AS via a charging function collecting entity, and combines the CDRs corresponding to a same CID for charging. For application or services employing an IP Multi-media Subsystem (IMS) as a service bearer network, the CIDs allocated are also called IMS Charging Identifiers (ICIDs). However, the inventor of this application finds out that the CID-based charging method described above can not meet the requirements of practical applications.

For example, in a service communication, when a UE establishes a session for a first time with an AS, the UE is given a CID. For some reasons, the UE exits the service communication temporarily before the service communication is ended. Later, the UE re-enters the service communication. In such a case the UE is given a new CID for a session established after re-entering the service communication. From a perspective of a user using the UE, the two sessions, established for the first entering and established for the re-entering respectively, are two related sessions, and need to be combined for a charging. However, from a perspective of the billing center, the two sessions correspond to different CIDs, thus the two sessions are considered as unrelated sessions. If the two sessions need to be correlated, the billing center needs to analyze CDRs of the two sessions and perform complicated calculation based on user information in the CDRs, yet it is still difficult to guarantee an accurate correlation of the two sessions. Such problem is more apparent in multi-party services.

In a multi-party service, UEs used by users of various parties of this service access a center control server via respective access server. The center control server provides centralized session handling, which includes session signaling control, media transmission authorization to communication parties, media data replication and distribution. One multi-party service has one center control server and at least one access server. The center control server performs controlling function (CF) and the access server performs participating function (PF). Logically, a CF corresponds to a multi-party service. In a multi-party service, the CF establishes one session for each UE, and each of the sessions corresponds to a PF. Therefore, the center control server performs a CF while the access server performs at least one PF corresponding to at least one UE connected to the access server.

Therefore, multi-party services have a common feature that, a multi-party service has at least one session and each session corresponds to a UE of one user and a CID. Due to such feature of multi-party services, the billing center needs to correlate a great number of CIDs when charging, which leads to poor charging accurate and difficult implementation. Moreover, for a multi-party service, there is also a need to charge a user by correlating a plurality of sessions of the user in one multi-party service. However, according to the charging technique of the prior art, the billing center needs to generate CDRs based on ICIDs first and make further calculations based on group information in the CDRs, which is still complicated and tends to be inaccurate.

As discussed above, CID-based charging method in the prior art cannot correlate different sessions of a user in one service communication, but only actions of the user in one session. Such charging method may easily charge twice for one action or leave an action uncharged, which threatens security and reliability of charging operations and reduces user satisfaction.

Furthermore, as new demands emerges, it is becoming more and more difficult for one AS to handle a plurality of application or services. Operators or service providers are developing multi-services including a plurality of sub-services, in order to provide more flexible and richer services. Relative to the multi-services, the above applications services provided by the AS may be called single-services. In a multi-service, each sub-service has a sub-service server e.g. an AS. A whole multi-service has a service control function adapted to control all sub-service servers in a manner, for example, the service control function controls initiation procedures of sub-services and controls assignment of sub-service session identifiers. A typical multi-service includes a sub-service regarded as a primary service, and all other sub-services of the multi-service are regarded as supplementary services. The sub-service server of the primary service may be called a primary service server and the sub-service servers of the supplementary services may be called supplementary service servers. The supplementary services rely on the primary service to some extent and provide supplementary functions for the primary service. For example, a Presence Server may be set in a PoC service network and be used to display group status to users during a PoC service. For another example, a Location Service Server (LCS Server) may also be set in a PoC service network to provide location information of participating users.

Along with the developing of multi-services, operators or service providers may develop charging policies for multi-services. However, as discussed in the preceding description, the conventional charging method is based on CIDs corresponding to separate sessions. Therefore the billing center needs to correlate CDRs of a plurality of services in a multi-service charging. Because a CID corresponds to only one session of a sub-service of a user, the billing center needs to analyze each CDR and perform comprehensive calculation with complicated processes, which leads to low charging accuracy and low feasibility.

Therefore, the conventional CID-based charging method is just applicable to correlating a plurality of actions of a user in one session, but is not applicable to correlating a plurality of sessions of a user in a single-service or and cannot correlate a plurality of sessions of a user in a plurality of sub-services of a multi-service.

SUMMARY OF THE INVENTION

Embodiments of a method and system for charging correlation, a billing center and an apparatus for generating charging data record for implementing a charging correlation for an application or service are provided, in order to implement a charging correlation process in a simple way and to greatly improve charging accuracy.

A charging correlation method for an application or service may include: receiving a service identifier assigned for an application or service; and correlating Charging Data Records CDRs generated for the application or service based on the service identifier.

A charging correlation system for an application or service may include: a service control function, adapted to assign a service identifier for an application or service; and a charging system, adapted to correlate Charging Data Records CDRs generated for the application or service based on the application identifier.

A billing center may include: a first module, adapted to receive a service identifier assigned to an application or service and CDRs generated for the application or service; and a second module, adapted to correlate the CDRs based on the service identifier from the first module.

An apparatus for charging data record generating may include: a first module, adapted to receive a service identifier assigned to an application or service; and a second module, adapted to generate Charging Data Records CDRs carrying the service identifier from the first module for the application or service.

The charging correlation method, and charging correlation system, the billing center and charging data record generating apparatus for implementing a charging correlation for an application or service provided by embodiments of the present invention are able to correlate a plurality of CDRs generated during an application or service, thereby implementing an correlated charging of a plurality of users participating in the application or service in a simple way. A plurality of CDRs generated for one user in the application or service may be correlated and the user can be charged accurately. Furthermore, correlated charging for multi-services can also be implemented. The technical solution provided in embodiments of the present invention is easy to be implemented and requires no major modification to the existing networks, and therefore is highly feasible.

DETAILED DESCRIPTION OF THE EMBODIMENTS

Figure 1A:
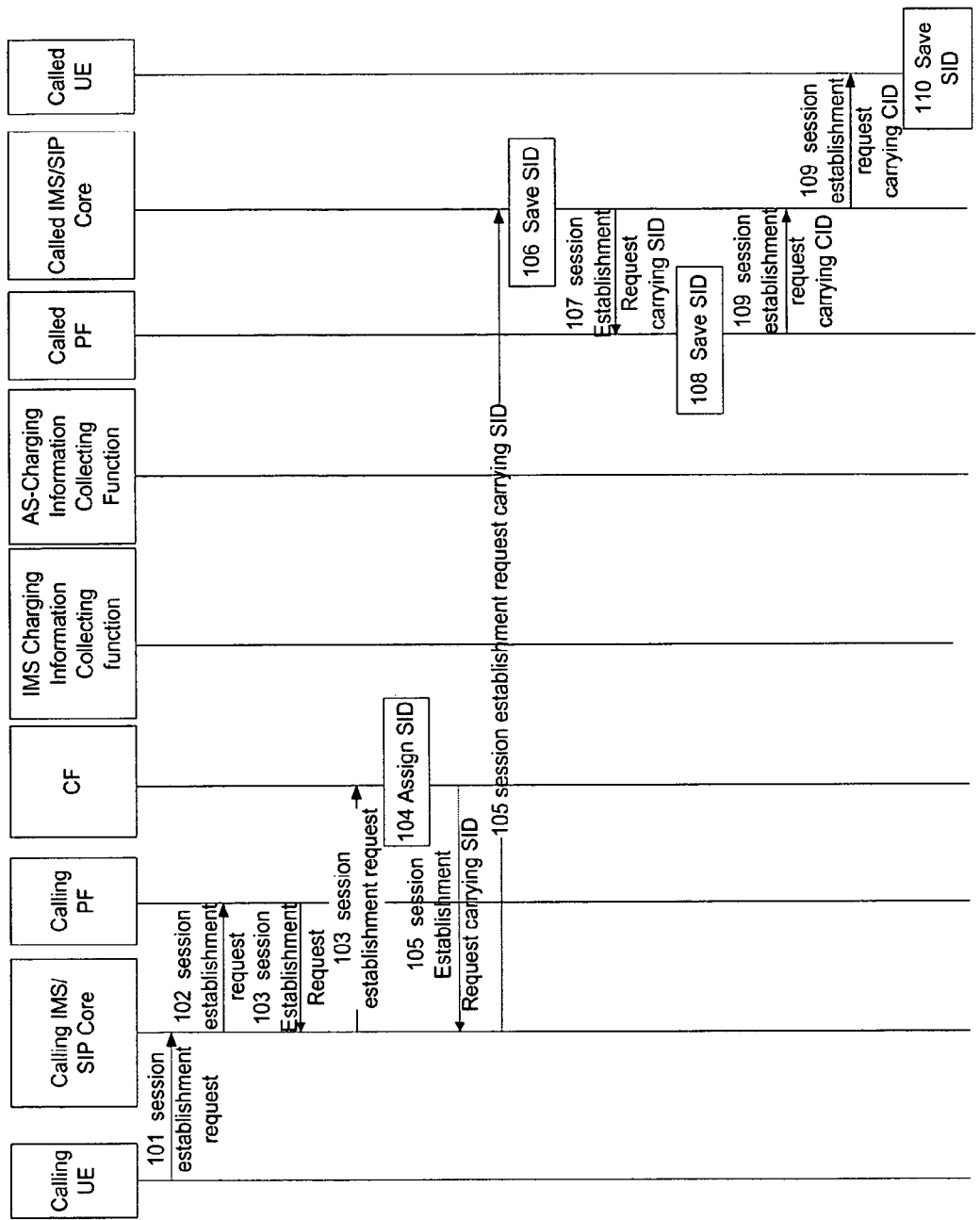
FIGS. 1A-B is a flowchart of a charging correlation process in a session establishment in accordance with an embodiment of the present invention.

This invention will hereinafter be described in detail with reference to accompanying drawings and embodiments.

A charging method for an application or service provided by an embodiment of the present invention may include: assigning a service identifier to an application or service, sending the service identifier to a charging system and correlating, by the charging system, different CDRs generated in this service based on the service identifier. The charging method is described in detail in following embodiments.

The charging system may include charging information collecting function used to receive CDRs from ASs and bearer control layer entities, a charging gateway, and a billing center used to correlate the CDRs and perform other operations for charging. The charging information collecting function functions as an interface of the charging system, receives CDRs from network nodes e.g., ASs or bearer control layer entities connected to the charging information collecting function, and sends the CDRs to the billing center via the charging gateway. ASs and the bearer control layer entities have respective charging information collecting functions. A charging information collecting function corresponding to ASs is usually called an AS-charging information collecting function and a charging information collecting function corresponding to bearer control layer entities is usually called a bearer control layer-charging information collecting function. For bearer control layer in an IMS, the bearer control layer-charging information collecting function is also called an IMS charging information collecting function. Embodiments of the present invention mainly focuses on transmission of service identifiers among ASs, bearer control layer entities and charging information collecting functions, therefore the figures and illustrations of the embodiments of the present invention omit the process that the charging information collecting functions send CDRs and service identifiers to the billing center. In the figures and illustrations of the embodiments of the present invention, the AS-charging information collecting function entities and IMS charging information collecting function entities are referred to as AS-charging information collecting functions and IMS charging information collecting functions.

A first charging correlation scheme given in an embodiment of the present invention implements charging with a plurality of CDRs generated for one user in a single-service. In this embodiment, a service control function, e.g. an AS of a single-service, assigns a uniform service identifier for the single-service, generates CDRs of participating users and sends the service identifier and the CDRs to a charging system. The charging system correlates the CDRs of a user in this application or service.

In practical applications, a user may establish one or a plurality of sessions in one service and one CDR corresponds to one session of the user. Different ways may be adapted to correlate CDRs based on the service identifier. The CDRs to be correlated may be CDRs corresponding to a plurality of sessions established for one user in one service, or may be CDRs corresponding to a plurality of sessions established for a part or all users in one service. The specific way of correlating CDRs is chosen in accordance with an applied correlation policy and is not described further herein.

The AS sends the service identifier and the CDRs to a charging information collecting function of a charging system. The charging information collecting function forwards the CDRs collected and the service identifier to a billing center which performs charging correlation operations. When the correlate-charging scheme is applied to application or service layer, the charging information collecting function includes an AS-charging information collecting function corresponding to the service control function entity. The correlate-charging scheme may also be applied to bearer control layer, and in such a case the charging information collecting function includes a bearer control layer-charging information collecting function corresponding to a bearer control layer entity corresponding to the service control function entity. The bearer control layer entity corresponding to the service control function is used to bear the service control function. The bearer control layer entity corresponding to the service control function records the service identifier and generates CDRs for the current application or service, and sends the service identifier and the CDRs to the bearer control layer-charging information collecting function of the bearer control layer entity. The AS-charging information collecting function and the bearer control layer-charging information collecting function respectively sends the CDRs and service identifiers to the billing center. The billing center correlates the CDRs from the AS-charging information collecting function and correlates the CDRs from the bearer control layer-charging information collecting function respectively. Or the billing center may correlates the CDRs from the AS-charging information collecting function with the CDRs from the bearer control layer-charging information collecting function. This charging correlation scheme in embodiments of the present invention may be applied to both the application or service layer and the bearer control layer in the embodiments shown in FIGS. 1A to 8. When the charging correlation scheme is applied only to the application or service layer, the charging correlation process involves UE, AS, AS-charging information collecting function and billing center, without involving the bearer control layer entity and the bearer control layer-charging information collecting function. The charging correlation process in which the charging correlation scheme is applied only to the application or service layer will not be described in detail herein, yet such process is still covered by the protection scope of the present invention.

The embodiments of the present invention are mainly oriented to session-based application or services such as multi-party services. In conventional session-based services, session IDs (SIDs) corresponding to different services are already employed. The existing SIDs may be used as service identifiers to correlate a plurality of CDRs. Also new identifiers may be defined as the service identifiers. Usually information exchanged among entities on the application or service layer is forwarded via corresponding bearer control layer entities. For example, servers that perform PF of the multi-party service, a server performing CF and UEs exchange information via corresponding bearer control layer entities such as an IMS/SIP Core network (IMS/SIP Core). At the same time, network functions in the IMS/SIP Core may also generate CDRs for a current application or service in order to implement a charging process on the bearer control layer. In such process the AS of each application or service corresponds to a bearer control layer entity adapted to bear the AS.

At present, the mainstream multi-party services include Push-to-Talk over Cellular network (PoC) service, and Conference service. In a PoC service session, a server performing CF is a PoC server performing CF, also called Controlling PoC Server; and the server performing PF is the PoC server performing PF, also called Participating PoC Server. In a Conference service session, the server performing CF is the Conference server performing CF, also called a Controlling Conference Server; and the server performing PF is the Conference server performing PF, also called a Participating Conference Server. The server performing PF and the server performing CF are logical functions of multi-party service servers, and the server performing PF and the server performing CF may be located in different ASs physically or in one AS. The server performing CF is referred to as the CF and the server performing PF is referred to as PF herein for the sake of simplicity. The embodiments of the present invention are described in detail herein taken a SIP based multi-party service as an example.

Figure 1B:
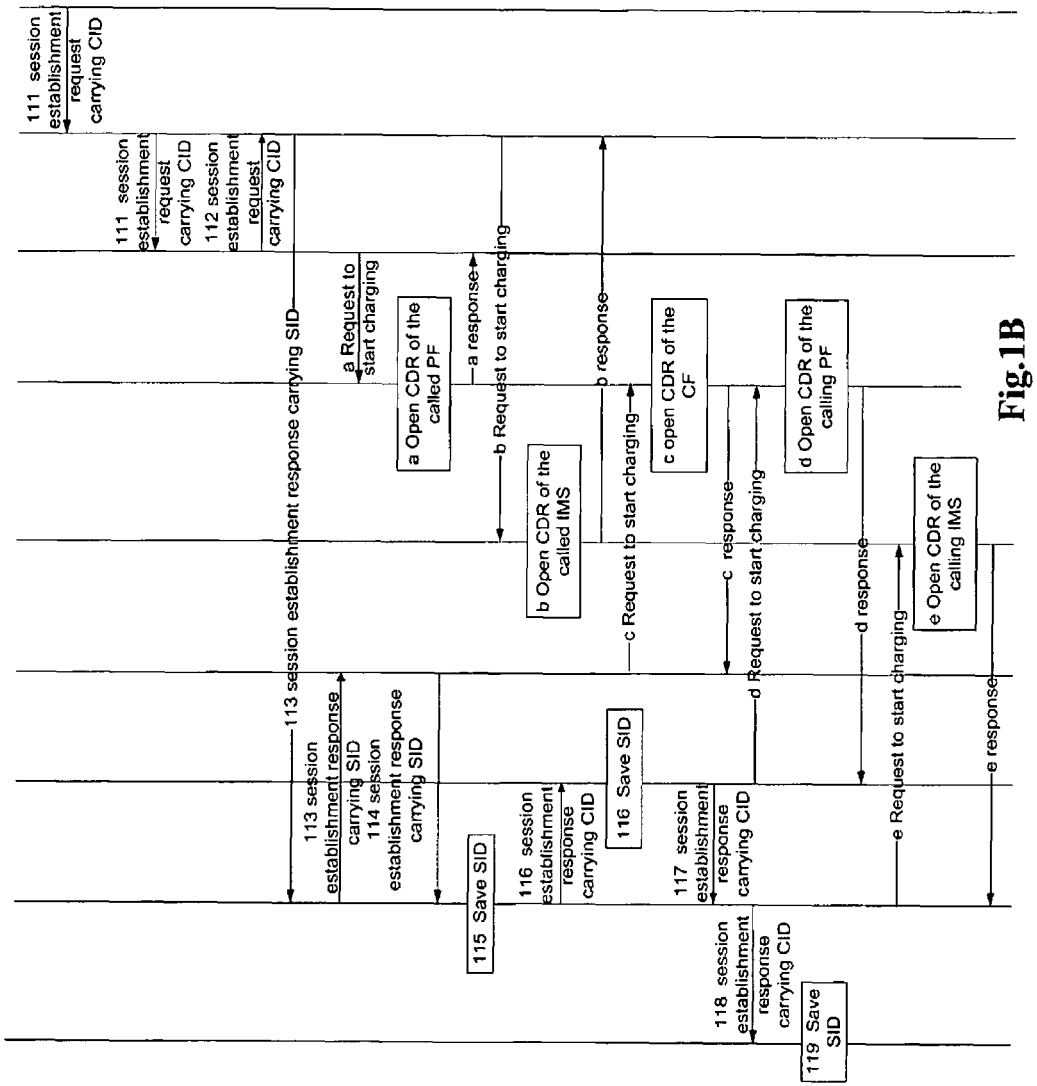

FIGS. 1A and 1B show a flowchart of a charging correlation process in a session establishment in accordance with an embodiment of the present invention. The entities involved in this embodiment include a calling UE and a calling PF of the calling UE, a calling IMS/SIP Core corresponding to the calling PF and the calling UE, a CF of a current multi-party service, a called UE and a called PF of the called UE, a called IMS/SIP Core corresponding to the called PF and the called UE. The entities involved in this embodiment also include an AS-charging information collecting function of the calling PF, CF, and the called PF, and an IMS charging information collecting function of the calling IMS/SIP Core and the called IMS/SIP Core. The calling UE, the calling PF and the CF correspond to a same bearer control layer entity i.e., the calling IMS/SIP Core, the called UE and the called PF correspond to a same bearer control layer entity i.e., the called IMS/SIP Core. The service control function of the current application or service performs CF of the multi-party service.

When the calling/called PF and CF are provided by servers in a network of one service provider, the calling/called PF and the CF may correspond to a same AS-charging information collecting function. In this embodiment, suppose that the calling/called PF and the CF correspond to a same AS-charging information collecting function. However, when the calling/called PF and the CF are provided by servers in different networks of different service providers, the calling/called PF and the CF may correspond to different AS-charging information collecting functions respectively and accordingly the calling/called PF and the CF send service identifiers and the CDRs to different AS-charging information collecting functions respectively. Similarly, when IMS/SIP Cores of the calling UE and the called UE are provided in a same operator network, the calling/called IMS/SIP Cores may correspond to one IMS charging information collecting function. When the IMS/SIP Cores of the calling UE and the called UE are in different networks provided by different operators, the calling/called IMS/SIP Cores may correspond to different IMS charging information collecting functions and send service identifiers and the CDRs to different IMS charging information collecting functions respectively. In this embodiment, suppose that the calling/called IMS/SIP Cores correspond to one IMS charging information collecting function.

As shown in FIGS. 1A and 1B, the process includes as follows.

101-102: The calling UE sends a session establishment request to the calling PF via corresponding calling IMS/SIP Core. The session establishment request may be carried in a SIP INVITE message in this embodiment; however, the present invention is not limited to this.

The application or service layer entities such as the UE, PF and CF, and corresponding bearer control layer entities such as the IMS/SIP Core, may be in the same network or in different networks. The present invention is not limited to this.

103: The calling PF forwards the session establishment request to the CF via the calling IMS/SIP Core.

104: The CF assigns a service identifier (SID) for a current multi-party service and the following shall be performed once for each of the called UEs.

105: The CF sends the session establishment request to the called IMS/SIP Core corresponding to the called PF via the calling IMS/SIP Core of the CF. The session establishment request carries the SID assigned in 104.

106-107: The called IMS/SIP Core saves the received SID and forwards the session establishment request carrying the SID to the called PF.

108-109: The called PF saves the received SID and forwards the session establishment request carrying the SID to the called UE via the called IMS/SIP Core.

110-111: The called UE saves the received SID and returns a session establishment response carrying the SID to the called PF via the called IMS/SIP Core. The session establishment response is carried in a SIP 200OK message in this embodiment, however, the present invention does not limit to this.

112-113: The called PF forwards the session establishment response carrying the SID to the CF via the called IMS/SIP Core and the calling IMS/SIP Core.

114: The CF returns the session establishment response carrying the SID to the calling IMS/SIP Core.

115-116: The calling IMS/SIP Core saves the received SID and returns the session establishment response carrying the SID to the calling PF, the calling PF also saves the received SID.

117-119: The calling PF returns the session establishment response carrying the SID to the calling UE via the calling IMS/SIP Core, and the calling UE saves the received SID. By now, a session establishment process is completed.

In this embodiment, after receiving the SID, the application or service layer entities and bearer control layer entities related to the charging correlation process may insert the SID into the CDRs generated for the current application or service and send the CDRs to corresponding charging information collecting functions. Specifically, the application or service layer entities and bearer control layer entities generate CDRs after receiving a session establishment response indicating a successful session establishment or after forwarding the session establishment request, and the SID is included in the CDRs and the CDRs are sent to the charging information collecting functions. This embodiment describes a process in which the session is successfully established; hence it is supposed that the session establishment response always indicates a successful session establishment. In FIGS. 1A and 1B, the application or service layer entities related to the charging correlation process include a calling PF, a called PF and a CF; the bearer control layer entities related to the charging correlation process include a calling IMS/SIP Core and a called IMS/SIP Core. The procedure of sending the SID and the CDRs by the application or service layer entities and bearer control layer entities related to the charging correlation process includes as follows.

The called PF may perform step a after forwarding the session establishment request in 109 or after receiving the session establishment response in 111. Step a is independent of other following steps and this embodiment of the present invention does not limit the sequence order of performing a and the steps following 111. Step a may include as follows. The called PF requests the AS-charging information collecting function to start charging and sends the CDR of the called UE carrying the SID to the AS-charging information collecting function. The AS-charging information collecting function opens the CDR and starts to record actions performed by the called UE with the called PF during a current multi-party service.

The called IMS/SIP Core may save the SID when forwarding the session establishment request or when forwarding session establishment response that carries the SID. The called IMS/SIP Core may further perform step b after receiving the session establishment response in 112. Step b is independent of other following steps and this embodiment of the present invention does not limit the sequence order of performing step b and the steps following 112. Step b may include as follows. The called IMS/SIP Core requests the IMS charging information collecting function to start charging, and sends the CDR of the called UE carrying the SID to the IMS charging information collecting function. The IMS charging information collecting function opens the CDR and starts to record actions performed by the called UE with the called IMS/SIP Core during the current multi-party service.

The CF may perform step c after receiving the session establishment response in 113. Step c is independent of other following steps and this embodiment of the present invention does not limit the sequence order of performing step c and the steps following 113. Step c may include as follows. The CF requests the AS-charging information collecting function to start charging and sends CDRs of the calling and called UEs carrying the SID to the AS-charging information collecting function. The AS-charging information collecting function opens the CDRs and starts to record actions performed by the calling and called UE with the CF during the current multi-party service.

The calling PF may perform step d after receiving the session establishment response in 116. Step d is independent of other following steps and this embodiment of the present invention does not limit the sequence order of performing step d and the steps following 116. Step d may include as follows. The calling PF requests the AS-charging information collecting function to start charging and sends the CDR of the calling UE carrying the SID to the AS-charging information collecting function. The AS-charging information collecting function opens the CDR and starts to record actions performed by the calling UE with the calling PF during the current multi-party service.

The calling IMS/SIP Core may save the SID after forwarding the session establishment response carrying the SID. The calling IMS/SIP Core may further perform step e after receiving the session establishment response in 117. Step e is independent of other following steps and this embodiment of the present invention does not limit the sequence order of performing step b and the steps following 117. Step e may include as follows. The calling IMS/SIP Core requests the IMS charging information collecting function to start charging and sends the CDR of the calling UE carrying the SID to the IMS charging information collecting function. The IMS charging information collecting function opens the CDR and starts to record actions performed by the calling UE with the calling IMS/SIP Core during the current multi-party service.

When the calling UE and the called UEs establish a session and start a multi-party service communication, the AS-charging information collecting function or the IMS charging information collecting function starts to record the actions of the calling and called UEs on the entities during the multi-party service in real-time.

In the embodiment shown in FIGS. 1A and 1B, the calling and the called PFs send the received SID to the calling and the called UEs respectively. As such, when it needs to request to modify a session, or to add a new user into a session, or to re-enter a user into a session, or to make a user exit a session, it is possible for the UEs to send the SID to a server performing PF or a server performing CF, in order to generate partial CDRs corresponding to the SID, or to generate a new CDR corresponding to the SID, or to update the CDR corresponding to the SID, or to close the CDR corresponding to the SID. However, sending the SID to the calling and the called UEs is not essential. It may be necessary to send the SID to the calling and the called UEs taking the above factors into consideration. In FIGS. 1A and 1B, the calling and the called UEs do not negotiate media parameters before establishing a session i.e., the calling and the called UEs establish an on-demand session. When the calling and the called UEs negotiate media parameters before establishing a session i.e., the calling and the called UEs establish a pre-established session, the charging correlation process will be slightly different from the process shown in FIGS. 1A and 1B, as shown in FIGS. 2A and 2B.

Figure 2A:
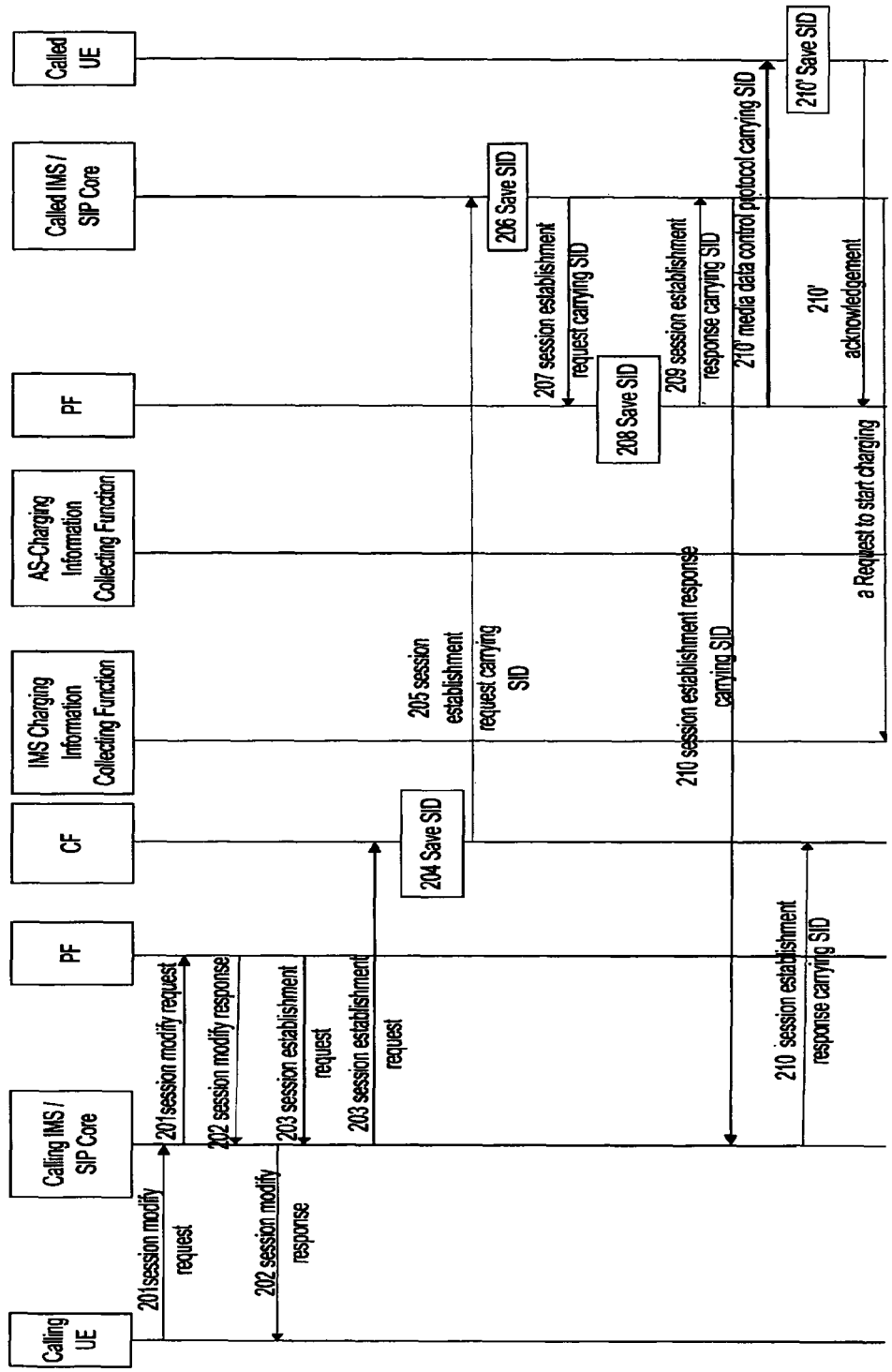
FIGS. 2A-B is a flowchart of a charging correlation process in a session establishment in accordance with an embodiment of the present invention.
Figure 2B:
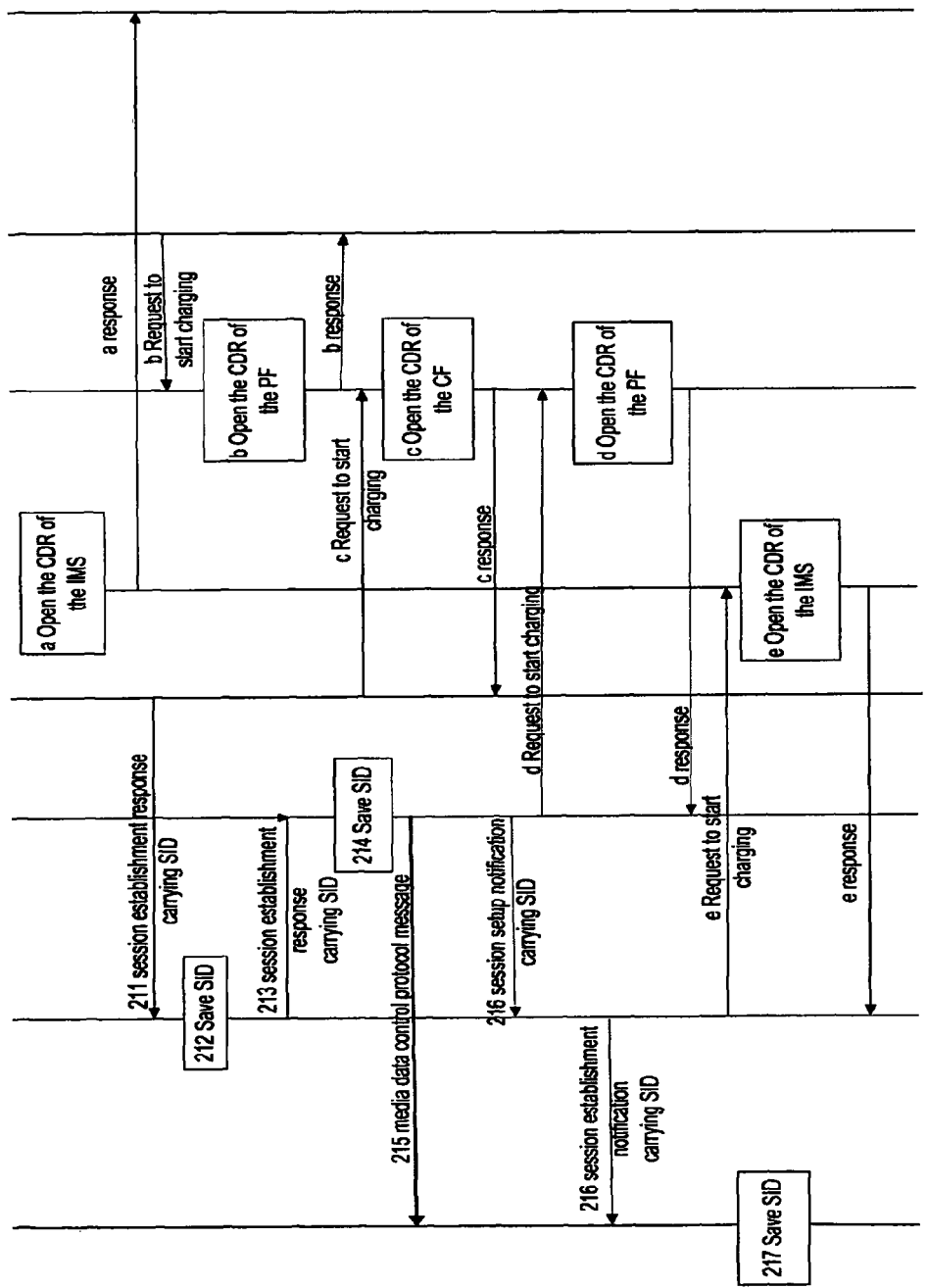

FIGS. 2A and 2B show a flowchart of a charging correlation process in a session establishment in accordance with an embodiment of the present invention. In this embodiment, media parameters have been negotiated between the calling UEs and the calling PF servers the calling UEs before establishment of a session, and media parameters have been negotiated also between the called UEs and the called PF servers the called UEs. The entities involved in the process are the same as the entities in FIGS. 1A and 1B. A brief description of the pre-established session is given as follows. Before establishing a session, the UE negotiates session parameters with the server performing PF for the UE. The UE initiates a session establishment process by a session modify request such as a parameter message (REFER message). Therefore in the session establishment process, session parameters negotiation may be omitted and the UE does not need to upload session parameters. The UE just needs to indicate the server performing PF which service is to be joined by the UE. As such, SIP signaling exchanged with the UE has fewer bits and air interface resources may be saved. The server performing PF then initiates a normal session establishment process with the server performing CF according to the indication from the UE, and informs the UE of a successful establishment by sending a media data control protocol message to the UE after the session between the PF and the CF is established. The media data control protocol may be the Talk Burst Control Protocol (TBCP) or the Media Burst Control Protocol (MBCP).

FIGS. 2A and 2B mainly include as follows.

201-202: The calling UE sends a session modify request to the calling PF via the calling IMS/SIP Core corresponding to the calling UE. The calling PF returns a session modify response to the calling UE. The session modify request may be carried in a SIP parameter message (SIP REFER message) and the session modify response may be carried in a SIP accepted message (SIP ACCEPTED message); however, the present invention is not limited to this.

203: The calling PF sends a session establishment request to the CF via the calling IMS/SIP Core corresponding to the calling PF.

204: The CF assigns a service identifier SID for a current multi-party service and the following is performed once for each of the called UEs.

205: The CF sends the session establishment request to the called IMS/SIP Core via the calling IMS/SIP Core. The session establishment request carries the SID assigned in 204.

206-207: The called IMS/SIP Core saves the received SID and forwards the session establishment request carrying the SID to the called PF.

208-210: The called PF saves the received SID and returns a session establishment response carrying the SID to the CF via the called IMS/SIP Core and the calling IMS/SIP Core.

While returning the session establishment response to the CF, the called PF also performs 210'. 210' may include as follows. The called PF sends to the called IMS/SIP Core a media data control protocol message carrying the SID, such as a TBCP Connect message used to notify the called UE to join the current service. The called UE saves the SID and returns an acknowledgment e.g. a TBCP Talk Burst Acknowledge message to the called PF via the called IMS/SIP Core. The called PF sends a confirmation e.g. a TBCP Talk Burst Confirm message to the called UE and then media data streams may be transmitted to the called UE.

In this embodiment, suppose that the called UE has negotiated parameters with the called PF and has set to an auto response mode. That is, the called PF may send the media data control protocol message to the called UE without requesting the called UE in advance and return a session establishment response to the CF. The media data control protocol message, such as a TBCP Connect message or a Talk Burst Confirm message that is sent to the called UE carries the SID. In another example, the called UE may also be set to a manual response mode. In other words, the called PF sends a session establishment request e.g. an INVITE message to the called UE in advance and sends the media data control protocol message to the called UE. The called PF sends a session establishment response to the CF after the called user agrees to join the current service. In such a case, the media data control protocol message such as a TBCP Connect message or Talk Burst Confirm message, or the session establishment request such as an INVITE message that is sent to the called UE may carry the SID.

211-214: The CF returns a session establishment response carrying the SID to the calling IMS/SIP Core. The calling IMS/SIP Core saves the received SID and returns a session establishment response carrying the SID to the calling PF. The calling PF also saves the received SID.

215-217: The calling PF sends a media data control protocol message such as a TBCP Connect message to the calling UE via the calling IMS/SIP Core to inform the calling UE that it is ready for a service session establishment. The calling UE returns an acknowledgment such as a TBCP Talk Burst Acknowledge message to the calling PF via the calling IMS/SIP Core. The calling PF sends a confirmation such as a TBCP Talk Burst Confirm message to the called UE and is ready to receive media data streams from the calling UE. After that, the calling PF sends a session establishment notification such as a NOTIFY message carrying the SID to the calling UE via the calling IMS/SIP Core. The calling UE saves the received SID and a whole session establishment process is completed.

In this process, the calling PF sends the SID to the calling UE in a session establishment notification or in a media data control protocol message such as a TBCP Connect message or a Talk Burst Confirm message.

The procedure of sending the SID and the CDRs from the application or service layer entities and bearer control layer entities related to the charging correlation process may include as follows.

The called IMS/SIP Core may save the SID after forwarding the session establishment request carrying the SID, the media data control protocol message carrying the SID, or the session establishment response carrying the SID. The called IMS/SIP Core may perform Step a after receiving the session establishment response, e.g., the response to the session establishment request or to the media data control protocol message, from the called UE. Step a is independent of other following steps and this embodiment of the present invention does not limit the sequence order of performing a and other steps. Step a may include as follows. The called IMS/SIP Core requests the IMS charging information collecting function to start charging, and sends the CDR of the called UE carrying the SID to the IMS charging information collecting function. The IMS charging information collecting function opens the CDR and starts to record actions performed by the called UE with the called IMS/SIP Core during the current multi-party service.

The called PF may perform step b after sending the session establishment request or media data control protocol message to the called UE, or after receiving the session establishment response e.g., a response to the session establishment request or a response to the media data control protocol message from the called UE. Step b is independent of other following steps and this embodiment of the present invention does not limit the sequence order of performing b and other steps. Step b may include as follows. The called PF requests the AS-charging information collecting function to start charging and sends the CDR of the called UE carrying the SID to the AS-charging information collecting function. The AS-charging information collecting function opens the CDR and starts to record actions performed by the called UE with the called PF during the current multi-party service.

The CF may perform step b after receiving the session establishment response in 210. Step c is independent of other following steps and this embodiment of the present invention does not limit the sequence order of performing step b and the steps following 210. Step c may include as follows. The CF requests the AS-charging information collecting function to start charging and sends CDRs of the calling and called UEs carrying the SID to the AS-charging information collecting function. The AS-charging information collecting function opens the CDRs and starts to record actions performed by the calling and called UE with the CF during the current multi-party service.

The calling PF may perform step d after receiving the session establishment response in 213. Step dD is independent of other following steps and this embodiment of the present invention does not limit the sequence order of performing step d and the steps following Step 213. Step d may include as follows. The calling PF requests the AS-charging information collecting function to start charging and sends the CDR of the calling UE carrying the SID to the AS-charging information collecting function. The AS-charging information collecting function opens the CDR and starts to record actions performed by the calling UE with the calling PF during the current multi-party service.

The calling IMS/SIP Core may save the SID after forwarding the session establishment response carrying the SID. The calling IMS/SIP Core may further perform Step e after receiving the session establishment response in 211. Step e is independent of other following steps and this embodiment of the present invention does not limit the sequence order of performing step e and the steps following 211. Step e may include as follows. The calling IMS/SIP Core requests the IMS charging information collecting function to start charging and sends the CDR of the calling UE carrying the SID to the IMS charging information collecting function. the IMS charging information collecting function opens the CDR and starts to record actions performed by the calling UE with the calling IMS/SIP Core during the current multi-party service.

During a multi-party service, a UE may modify the session, for example, the UE may modify the session media parameters, which may result that the AS-charging information collecting function or IMS charging information collecting function may generate a partial CDR. The partial CDR and original CDRs belong to the same multi-party service and need to be correlated in the charging correlation process. Therefore, in a session modification process, the UE needs to send the SID saved during the session establishment process to entities related to the charging correlation process such as the server performing PF and the server performing CF, so that the entities can generate partial CDRs corresponding to the SID. In this way the partial CDR may be correlated with other CDRs generated for the multi-party service.

Figure 3A:
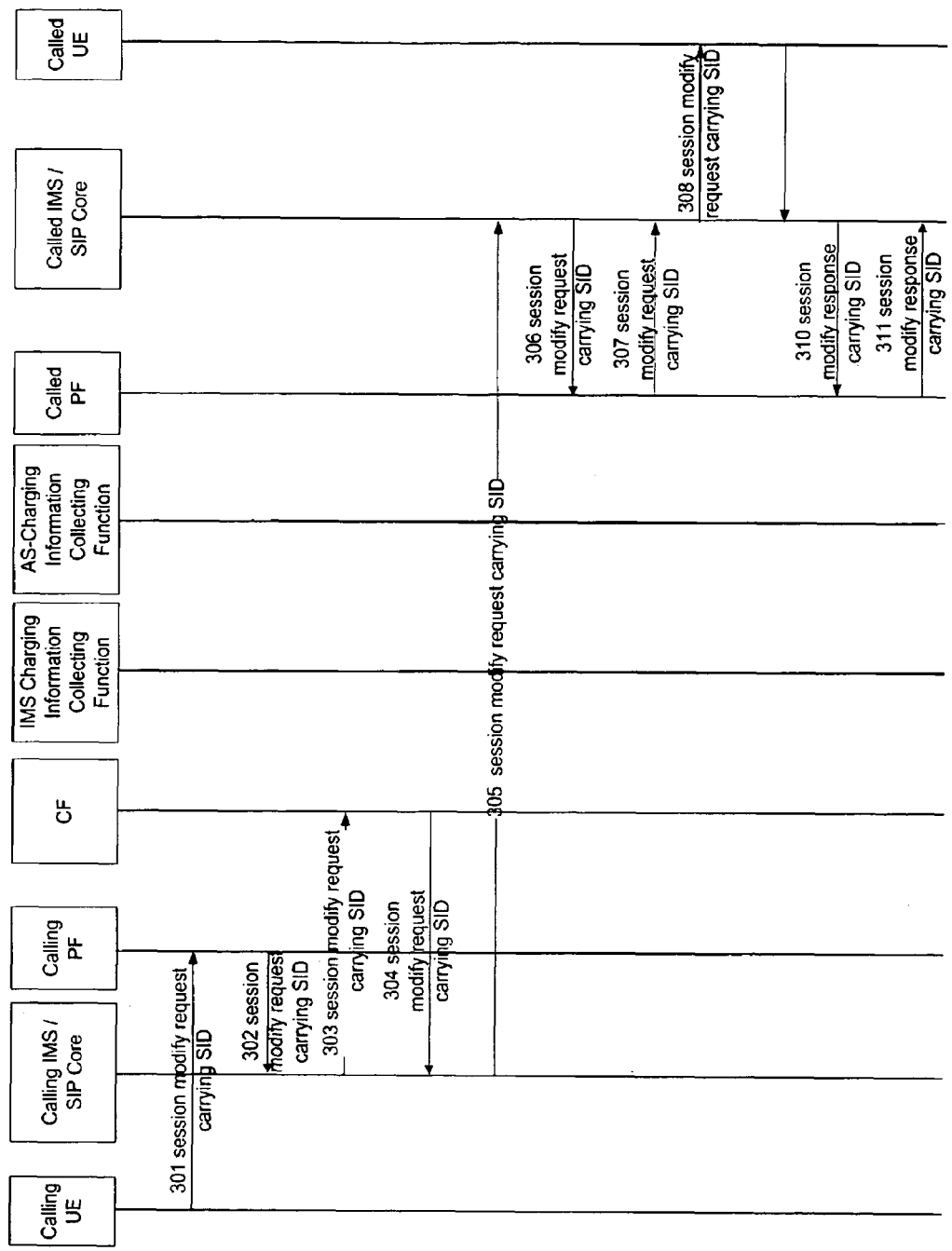
FIG. 3A-B is a flowchart of a charging correlation process in a session modification in accordance with an embodiment of the present invention.
Figure 3B:
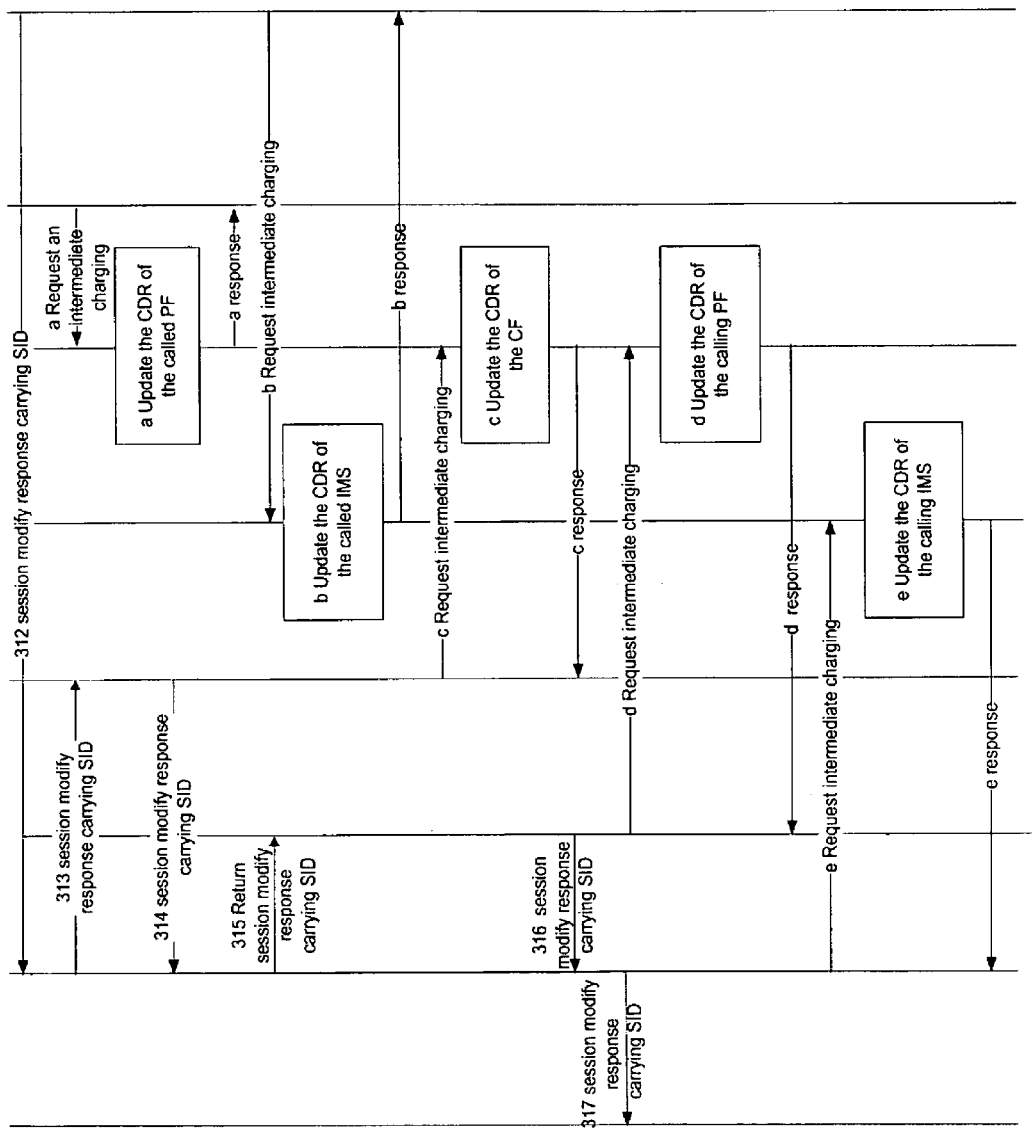

FIGS. 3A and 3B show a flowchart of a charging correlation process in a session modification process in accordance with an embodiment of the present invention. The entities involved in this embodiment may include: a calling UE and a calling PF of the calling UE, a calling IMS/SIP Core corresponding to the calling PF and the calling UE, a CF of a current multi-party service, a called UE and a called PF of the called UE, and a called IMS/SIP Core corresponding to the called PF and the called UE. This embodiment also involves: an AS-charging information collecting function corresponding to the calling PF, called PF and CF, and an IMS charging information collecting function corresponding to the calling IMS/SIP Core and the called IMS/SIP Core. FIGS. 3A and 3B include the following processes.

301: The calling UE sends a session modify request carrying the SID to the calling PF via the calling IMS/SIP Core. The session modify request is carried in a SIP UPDATE message or a SIP REINVITE message in this embodiment, however, the present invention is not limited to this.

302: The calling PF sends the session modify request carrying the SID to the calling IMS/SIP Core.

303: The calling IMS/SIP Core forwards the session modify request carrying the SID to the CF, and the following is performed once for each of the called UEs.

304-305: The CF sends the session modify request carrying the SID to the called IMS/SIP Core via the calling IMS/SIP Core.

306: The called IMS/SIP Core forwards the session modify request carrying the SID to the called PF.

307-308: The called PF sends the session modify request carrying the SID to the called UE via the called IMS/SIP Core.

309-310: The called UE returns a session modify response carrying the SID to the called PF via the called IMS/SIP Core. The session modify response may be carried in a SIP 200OK message in this embodiment; however, the present invention is not limited to this.

311-313: The called PF forwards the session modify response carrying the SID to the CF via the called IMS/SIP Core and the calling IMS/SIP Core.

314-315: The CF returns the session modify response carrying the SID to the calling IMS/SIP Core, the calling IMS/SIP Core returns the session modify response carrying the SID to the calling PF.

316-317: The calling PF returns the session modify response carrying the SID to the calling UE via the calling IMS/SIP Core and the session modify process is completed.

In the above process, the procedure of sending the SID and the CDRs by the application or service layer entities and bearer control layer entities related to the charging correlation process includes as follows.

The called PF may perform step a after sending the session modify request to the called UE or after receiving the session modify response from the called UE. Step a is independent of steps following 307 and the present invention does not limit the sequence order of performing a and the steps following 307. Step a may include as follows. The called PF requests the AS-charging information collecting function to start an intermediate charging and sends a partial CDR of the called UE, generated by the called PF and carrying the SID, to the AS-charging information collecting function. The AS-charging information collecting function updates CDR of the called PF, saves the partial CDR and starts to record actions that are performed by the called UE on the called PF and may affect an accounting after the session is modified in the current multi-party service.

The called IMS/SIP Core may save the SID after forwarding the session modify request or session modify request response carrying the SID. The called IMS/SIP Core may further perform step b after receiving the session modify response from the called UE. Step b is independent of steps following 309 and the present invention does not limit the sequence order of performing step b and the steps following 309. Step b may include as follows. The called IMS/SIP Core requests the IMS charging information collecting function to start an intermediate charging and sends a partial CDR of the called UE, generated by the called IMS/SIP Core and carrying the SID, to the IMS charging information collecting function. The IMS charging information collecting function updates CDR of the called IMS/SIP Core, saves the partial CDR and starts to record actions that are performed by the called UE on the called IMS/SIP Core and may affect an accounting after the session is modified in the current multi-party service.

The CF may perform step c after receiving the session modify response in 313. Step c is independent of steps following 313 and the present invention does not limit the sequence order of performing step c and the steps following 313. Step c may include as follows. The CF requests the AS-charging information collecting function to start an intermediate charging and sends the partial CDRs of the calling UEs and the called UEs, generated by the CF and carrying the SID, to the AS-charging information collecting function. The AS-charging information collecting function updates CDR of the CF, saves the partial CDRs of the calling and the called UEs and starts to record actions that are performed by the calling and called UE on the CF and may affect an accounting after the session is modified in the current multi-party service.

The calling PF may perform step d after receiving the session modify response in 315. Step d is independent of steps following 315 and the present invention does not limit the sequence order of performing step d and the steps following 315. Step d may include as follows. The calling PF requests the AS-charging information collecting function to start an intermediate charging and sends the partial CDR of the calling UE, generated by the calling PF and carrying the SID, to the AS-charging information collecting function. The AS-charging information collecting function updates CDR of the calling PF, saves the partial CDR of the calling UE and starts to record actions that are performed by the calling UE on the calling PF and may affect an accounting after the session is modified in the current multi-party service.

The calling IMS/SIP Core may save the SID while forwarding the session modify response carrying the SID. The calling IMS/SIP Core may further perform step e after receiving the session modify response in 314. Step e is independent of steps following 314 and the present invention does not limit the sequence order of performing step e and the steps following 314. Step e may include as follows. the calling IMS/SIP Core requests the IMS charging information collecting function to start an intermediate charging and sends the partial CDR of the calling user, generated by the calling IMS/SIP Core and carrying the SID, to the IMS charging information collecting function. The IMS charging information collecting function updates CDR of the calling IMS/SIP Core, saves the partial CDR of the calling user and starts to record actions that are performed by the calling UE on the calling IMS/SIP Core and may affect an accounting after the session is modified in the current multi-party service.

In the embodiments shown in FIGS. 1A to 3B, the calling PF, the CF and the called PF are separated entities. In practical applications, any one or combination of the calling PF, the CF and the called PF may be provided by one entity, in which case the basic processes are the same as the embodiments shown in FIGS. 1A to 3B, and will not be described in detail herein but are still covered by the protection scope of the present invention.

In FIGS. 1A to 2B, the calling PF and the CF correspond to a same IMS/SIP Core and the called PF corresponds to another IMS/SIP Core. In practical applications, the calling PF, the CF and the called PF may correspond to different IMS/SIP Cores. When the calling UE and a called UE are in one network provided by an operator, the calling PF and the called PF of the called UE may correspond to a same IMS/SIP Core. When the calling UE and a called UE are in different networks provided by different operators, the calling PF and the called PF correspond to different IMS/SIP Cores. When the calling PF and the CF are in one network provided by a same operator, the calling PF and the CF correspond to a same IMS/SIP Core. When the called PF and the CF are in different networks provided by different operators, the called PF and the CF user correspond to different IMS/SIP Cores. However, no matter the calling PF, the CF and the called PF correspond to a same IMS/SIP Core or to different IMS/SIP Cores, the processes in embodiments of the present invention are essentially the same. In one word, the application or service layer entities such as the calling PF, the CF and the called PF send/receive session establishment/modify requests or session establishment/modify responses via corresponding IMS/

SIP Cores, and the detailed processes thereof will not be described herein, but are still covered by the protection scope of the present invention.

During an existing multi-party service, when adding a new user, the control function entity (e.g., the CF) of the multi-party service generates a new CDR for a session of the new user. A service identifier will be adapted to correlate the CDRs of the new user when adding the new user.

Figure 4:
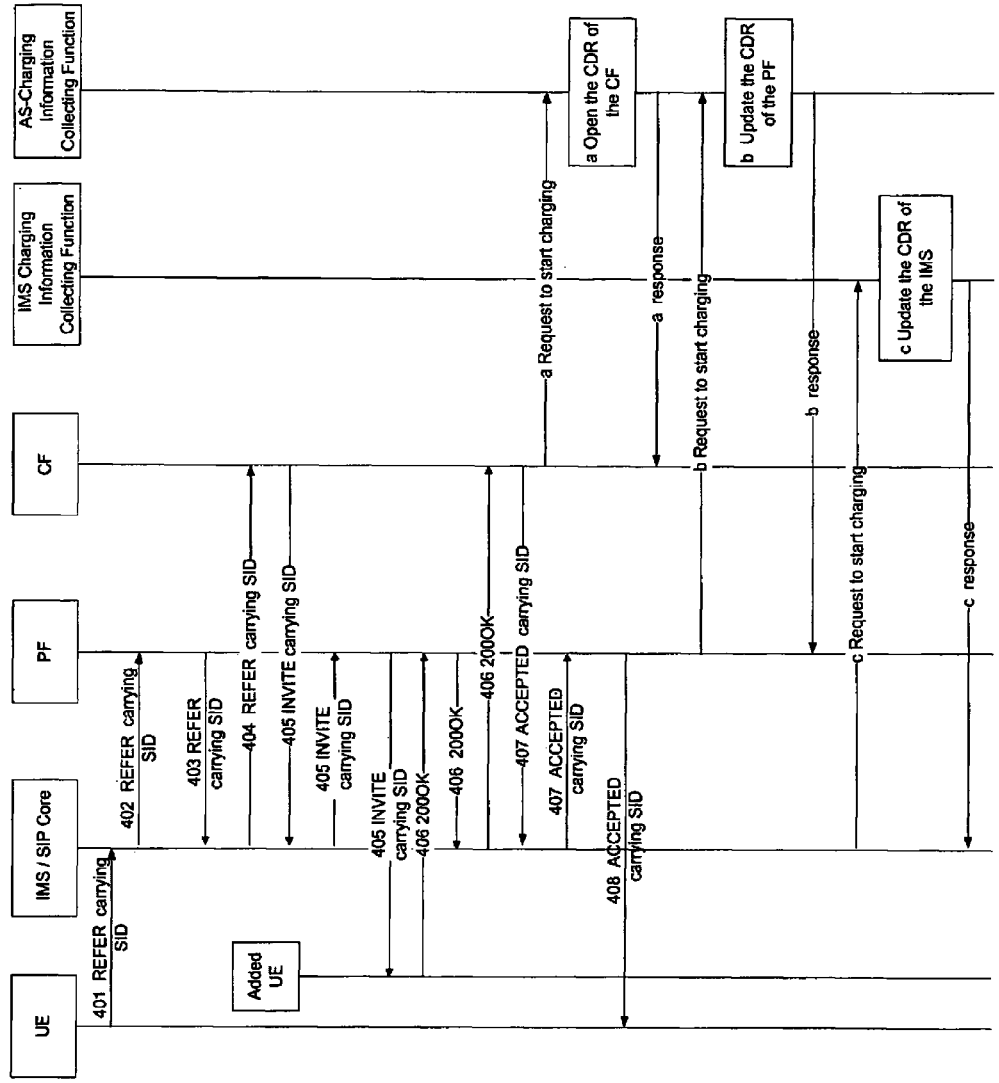
FIG. 4 is a flowchart of a charging correlation process when adding a new user in accordance with an embodiment of the present invention.

FIG. 4 shows a flowchart of a charging correlation process when adding a new user to an existing multi-party service in accordance with an embodiment of the present invention. A process of adding a new user includes: requesting by a UE to add another user (a third party user) into a current multi-party service. The third party user is shown as an added UE in FIG. 4. The entities involved in this embodiment include: a UE and a PF of the UE, an IMS/SIP Core corresponding to the UE, an added UE, a CF of the current multi-party service, an AS-charging information collecting function and an IMS charging information collecting function. In this embodiment, suppose that the UE and the new user added to the current service (the added UE) are served by the same PF, and the UE, the added UE, the PF and the CF correspond to the same IMS/SIP Core.

As shown in FIG. 4, the process includes as follows.

401-402: The UE sends an adding request carrying an SID to the PF via the IMS/SIP Core. The adding request may be carried in a SIP REFER message in this embodiment; however, the present invention is not limited to this.

403-404: The PF sends the adding request carrying the SID to the CF via the IMS/SIP Core.

405-406: The CF sends the adding request carrying the SID to the PF of the added UE via the IMS/SIP Core, and the PF forwards the adding request carrying the SID to the added UE. The added UE returns an adding response carrying the SID to the PF via the IMS/SIP Core after receiving the adding request. The PF returns the adding response carrying the SID to the CF via the IMS/SIP Core. As such, the new UE is added to the current service.

The adding request may be carried in a SIP INVITE message and the adding response may be carried in a SIP 200OK message, however, the present invention is not limited to this.

407: The CF returns the adding response carrying the SID to the PF of the UE via the IMS/SIP Core. The PF informs the UE that the new user has to be added to the current service by returning the adding response carrying the SID to the UE via the IMS/SIP Core. The adding response may be carried in a SIP ACCEPTED message in this embodiment; however, the present invention is not limited to this.

In FIG. 4, the application or service layer entities related to the charging correlation process include the PF and the CF. The CF may perform step a after receiving the adding response in 406. Step a is independent of other following steps and the present invention does not limit the sequence order of performing step a and the following steps. The PF may perform step b after receiving the adding response in 406 and step b is independent of other following steps and the present invention does not limit the sequence order of performing step b and the following steps.

Step a may include as follows. The CF requests the AS-charging information collecting function to start charging and sends the CDR of the new user (the added UE) generated by the CF and carrying the SID to the AS-charging information collecting function. The AS-charging information collecting function opens the CDR of the new user from the CF and starts to record actions performed by the new user on the CF during the current multi-party service.

Step b may include as follows. The PF requests the AS-charging information collecting function to start charging and sends the CDR of the new user generated by the PF and carrying the SID to the AS-charging information collecting function. The AS-charging information collecting function opens the CDR of the new user from the PF and starts to record actions performed by the new user on the PF during the current multi-party service.

The bearer control layer entity related to the charging correlation process in FIG. 4 is the IMS/SIP Core. The IMS/SIP Core may perform step c after receiving the adding response in 406, and step c is independent of other following steps and the present invention does not limit the sequence order of performing step c and the following steps. Step c may include as follows. The IMS/SIP Core requests the IMS charging information collecting function to start charging and sends the CDR of the new user generated by the IMS/SIP Core and carrying the SID to the IMS charging information collecting function. The IMS charging information collecting function opens the CDR of the new user from the IMS/SIP Core and starts to record actions performed by the new user on the IMS/SIP Core during the current multi-party service.

In embodiments shown in FIGS. 3A to 4, the UE may establish an on-demand session or have a pre-established session. The processes in FIGS. 3A to 4 may be applied to both cases.

If a UE quits a session, the AS-charging information collecting function and the IMS charging information collecting function need to close the CDRs of the multi-party service of the UE. In such a case, the SID of the current multi-party service needs to be sent to the AS-charging information collecting function and the IMS charging information collecting function so that the CDRs corresponding to a same SID among all CDRs of the UE may be closed based on the SID.

Figure 5:
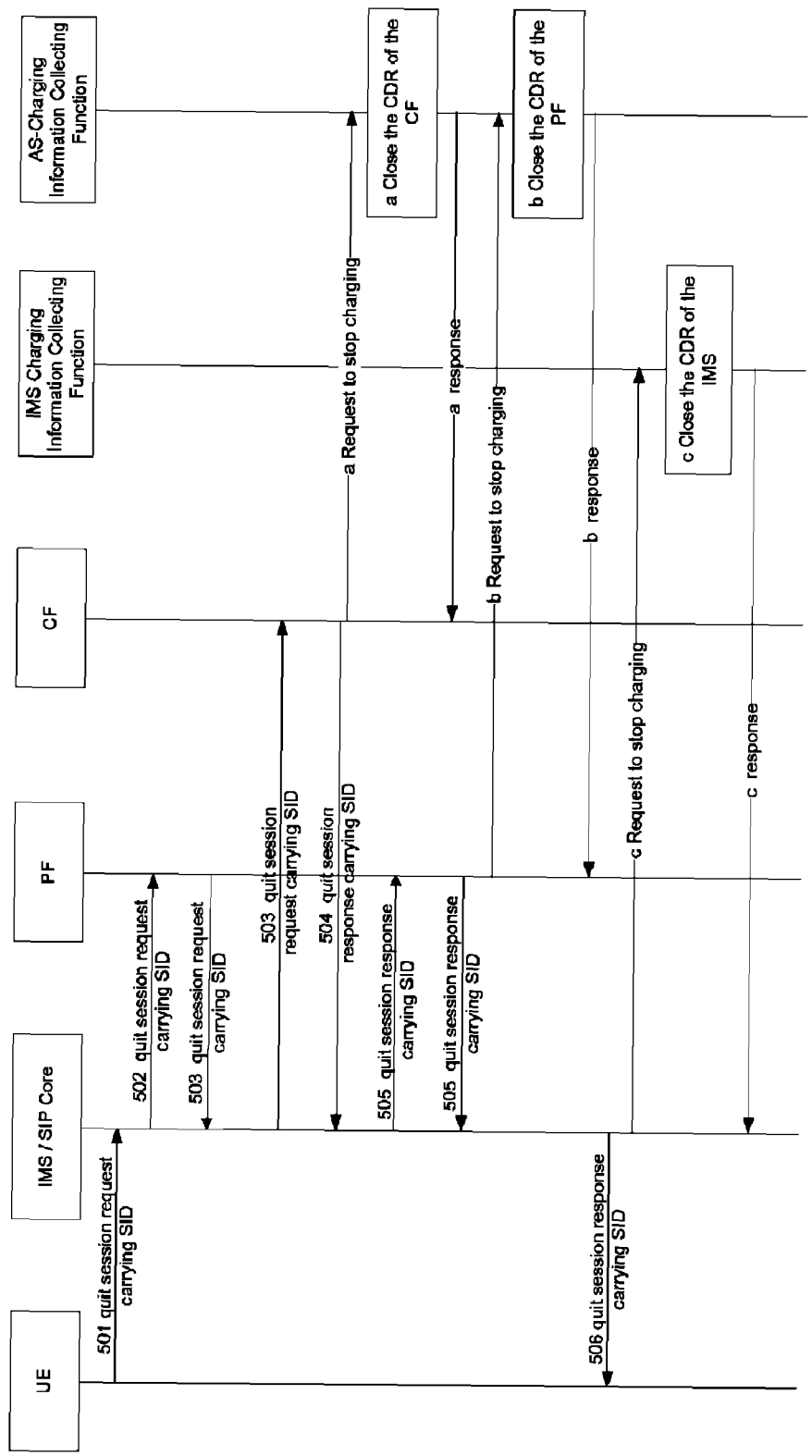
FIG. 5 is a flowchart of a charging correlation process of an on-demand session in accordance with an embodiment of the present invention.

FIG. 5 shows a flowchart of a charging correlation process when a UE establishing a pre-established session quits a session in accordance with an embodiment of the present invention. The entities involved in this embodiment include: a UE and a PF of the UE, an IMS/SIP Core corresponding to the UE, a CF of a current multi-party service, an AS-charging information collecting function and an IMS charging information collecting function. In this embodiment, the UE, the PF and the CF correspond to a same IMS/SIP Core.

As shown in FIG. 5, the process includes as follows.

501-502: The UE sends a quit session request carrying an SID to the PF via the IMS/SIP Core. The quit session request is carried in a SIP BYE message in this embodiment, however, the present invention is not limited to this.

503: The PF sends the quit session request carrying the SID to the CF via the IMS/SIP Core.

504: The CF returns a quit session response carrying the SID to the PF via the IMS/SIP Core. The quit session response may be carried in a SIP 200OK message in this embodiment, however, the present invention is not limited to this.

505-506: The PF sends the quit session response carrying the SID to the UE via the IMS/SIP Core.

In FIG. 5, the application or service layer entities related to the charging correlation process include the PF and the CF. The CF may perform step a after receiving the quit session response in 503. Step a is independent of following steps and the present invention does not limit the sequence order of performing step a and the steps following 503. The PF may perform step b after receiving the quit session response in 504 and step b is independent of following steps and the present invention does not limit the sequence order of performing step b and the steps following 504.

Step a may include as follows. The CF requests the AS-charging information collecting function to stop charging and sends the SID to the AS-charging information collecting function. The AS-charging information collecting function closes CDR of the UE from the CF and stops recording charging data of the UE.

Step b may include as follows. The PF requests the AS-charging information collecting function to stop charging and sends the SID to the AS-charging information collecting function. The AS-charging information collecting function closes CDR of the UE from the PF and stops recording the charging data of the UE.

The bearer control layer entity related to the charging correlation process in FIG. 5 is the IMS/SIP Core. The IMS/SIP Core may perform step c after receiving the quit session response in 505, and step c is independent of following steps and the present invention does not limit the sequence order of performing step c and the steps following 505.

Step c may include as follows. The IMS/SIP Core requests the IMS charging information collecting function to stop charging and sends the SID to the IMS charging information collecting function. The IMS charging information collecting function closes CDR of the UE from the PF.

Figure 6:
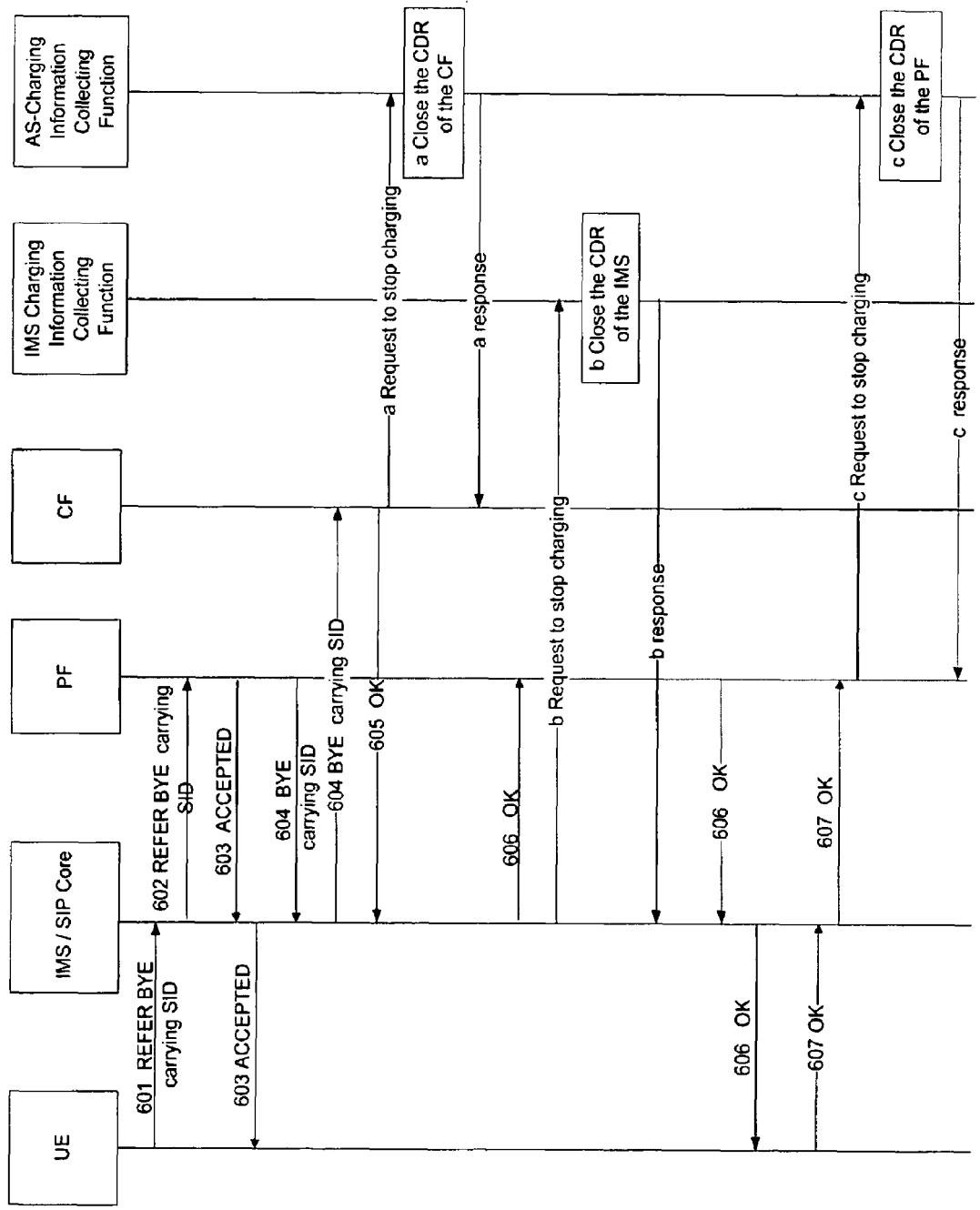
FIG. 6 is a flowchart of a charging correlation process of a pre-established session in accordance with an embodiment of the present invention.

The quit session process shown in FIG. 5 is suitable to a user establishing an on-demand session. For a user establishing a pre-established session, a different quit session process shall be used. FIG. 6 shows a flowchart of a charging correlation process for a user establishing a pre-established session in accordance with an embodiment of the present invention. The entities involved in this embodiment include: a UE and a PF of the UE, an IMS/SIP Core corresponding to the UE, a CF of a current multi-party service, an AS-charging information collecting function and an IMS charging information collecting function. In this embodiment, the UE, the PF and the CF correspond to a same IMS/SIP Core.

A whole session establishment process for a user establishing a pre-established session includes two parts: firstly, the UE and the PF negotiate session parameters before establishing a session; secondly, the PF establishes a session for the UE with the CF when the UE is ready for establishing the session. Therefore this kind of session establishment process shall be ended in two steps: firstly, the session pre-established between the UE and the PF is modified; secondly, the session between the PF and the CF is released. As shown in FIG. 6, the process includes as follows.

601-602: The UE sends a session modify and quit session request carrying an SID to the PF via the IMS/SIP Core. The session modify and quit session request may be carried in a SIP REFER BYE message in this embodiment; however, the present invention is not limited to this.

603: The PF returns a session modify response to the UE via the IMS/SIP Core. The session modify response may be carried in a SIP ACCEPTED message in this embodiment; however, the present invention is not limited to this.

604: The PF sends a quit session request carrying the SID to the CF via the IMS/SIP Core. The quit session request may be carried in a BYE message, however, the present invention is not limited to this.

605: The CF returns a quit session response to the PF via the IMS/SIP Core. The quit session response may be carried in a SIP 200OK message in this embodiment, however, the present invention is not limited to this.

606-607: The PF sends a quit session notification to the UE via the IMS/SIP Core to notify the UE of a successful release of the session between the UE and the CF. The UE returns a quit session response to the PF. The quit session response may be carried in a NOTIFY message, and the quit session response may be carried in an OK message; however, the present invention is not limited to this.

In FIG. 6, the application or service layer entities related to the charging correlation process include the PF and the CF. The CF may perform step a after receiving the quit session request in 604 and after successful releasing the session. Step a is independent of following steps and the present invention does not limit the sequence order of performing step a and the steps following 604. The PF may perform step a after receiving the quit session response in 607.

Step a may include as follows. The CF requests the AS-charging information collecting function to stop charging and sends the SID to the AS-charging information collecting function. The AS-charging information collecting function closes CDR of the UE from the CF and stops recording the charging data of the UE.

Step b may include as follows. The PF requests the AS-charging information collecting function to stop charging and sends the SID to the AS-charging information collecting function. The AS-charging information collecting function closes CDR of the UE from the PF and stops recording the charging data of the UE.

The bearer control layer entity related to the charging correlation process in FIG. 6 is the IMS/SIP Core. The IMS/SIP Core may perform step c after receiving the quit session response in 605, and step c is independent of following steps and the present invention does not limit the sequence order of performing step c and the steps following 605.

Step c may include as follows. The IMS/SIP Core requests the IMS charging information collecting function to stop charging and sends the SID to the IMS charging information collecting function. The IMS charging information collecting function closes CDR of the UE from the PF.

Besides the situations described above, new CDRs may be generated by the entities related to the charging correlation process in two other saturation. The charging correlation processes in accordance with the embodiments of the present invention are suitable in such two situations. In the first situation, a user establishing an on-demand session drops out of a current multi-party service session temporarily while the current multi-party service proceeds, then the user re-enters the multi-party service. In the second of the two situations, a user establishing a pre-established session drops out of a current multi-party service session temporarily while the current multi-party service proceeds, then the user re-enters the multi-party service. The charging correlation processes in the two situations are described with reference to FIGS. 7 and 8.

Figure 7:
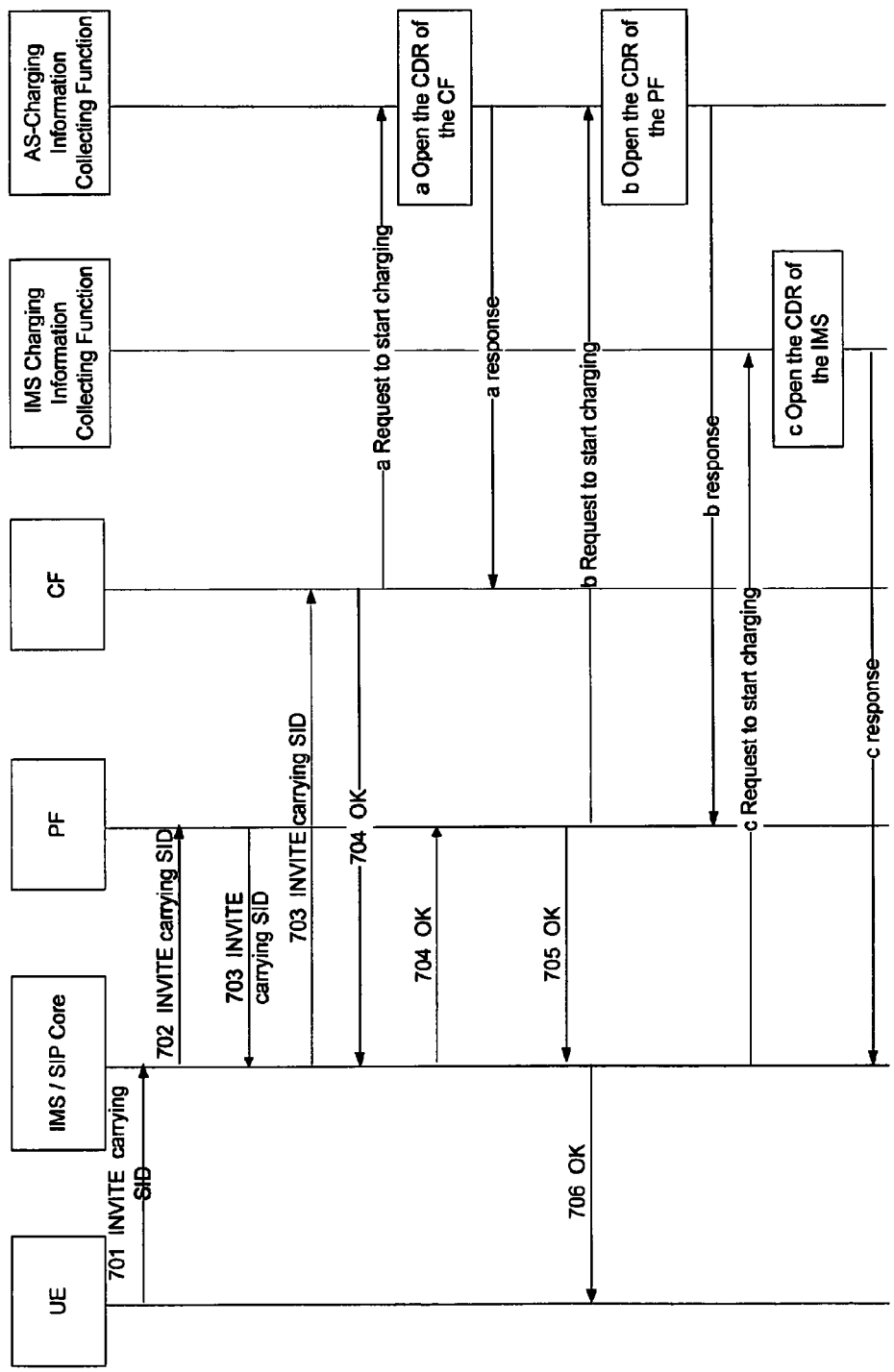
FIG. 7 is a flowchart of a charging correlation process when a user establishing an on-demand session re-enters the session in accordance with an embodiment of the present invention.

FIG. 7 shows a flowchart of a charging correlation process in a case that a user establishing an on-demand session re-enters a session of after the user drops out of the session in accordance with an embodiment of the present invention. The entities involved in this embodiment include: a UE and a PF of the UE, an IMS/SIP Core corresponding to the UE, a CF of a current multi-party service, an AS-charging information collecting function and an IMS charging information collecting function. In this embodiment, the UE, the PF and the CF correspond to a same IMS/SIP Core. As shown in FIG. 7, the process includes as follows.

701-702: The UE sends a join session request carrying an SID to the PF via the IMS/SIP Core. The join session request may be carried in a SIP REFER message or a SIP INVITE message in this embodiment; however, the present invention is not limited to this.

703: The PF sends the join session request carrying the SID to the CF via the IMS/SIP Core.

704: The CF returns a join session response carrying the SID to the PF via the IMS/SIP Core. The join session response may be carried in a SIP OK message or a SIP ACCEPTED message in this embodiment; however, the present invention is not limited to this.

705-706: The PF sends the join session response carrying the SID to the UE via the IMS/SIP Core.

In FIG. 7, the application or service layer entities related to the charging correlation process include the PF and the CF. The CF may perform step a after receiving the join session response in 703. Step a is independent of following steps and the present invention does not limit the sequence order of performing step a and the steps following 703. The PF may perform step b after receiving the join session response in 704 and step b is independent of following steps and the present invention does not limit the sequence order of performing step b and the steps following 704.

Step a may include as follows. the CF requests the AS-charging information collecting function to start charging and sends the CDR of the user requesting to re-enter the session (the UE), which is generated by the CF and carries the SID, to the AS-charging information collecting function. The AS-charging information collecting function opens the CDR of the UE from the CF and starts to record actions that are performed by the UE on the CF and affect an accounting during the current multi-party service. It should be noted that when the user re-enters the session, the opened CDR of the UE is a new CDR instead of the CDR of the UE generated before the UE dropped out of the session. However, the two CDRs have the same SID and may be correlated based on the SID.

Step b may include as follows. The PF requests the AS-charging information collecting function to start charging and sends the CDR of the UE, which is generated by the PF and carries the SID, to the AS-charging information collecting function. The AS-charging information collecting function opens the CDR of the UE from the PF and starts to record actions that are performed by the UE on the PF and affect the accounting during the current multi-party service.

The bearer control layer entity related to the charging correlation process in FIG. 7 is the IMS/SIP Core. The IMS/SIP Core may perform step c after receiving the join session response in 705, and step c is independent of following steps and the present invention does not limit the sequence order of performing step c and the steps following 705.

Step c may include as follows. The IMS/SIP Core requests the IMS charging information collecting function to start charging and sends the CDR of the UE, which is generated by the IMS/SIP Core and carries the SID, to the IMS charging information collecting function. The IMS charging information collecting function opens the CDR of the UE from the IMS/SIP Core and starts to record actions that are performed by the UE on the IMS/SIP Core and affect the accounting during the current multi-party service.

Figure 8:
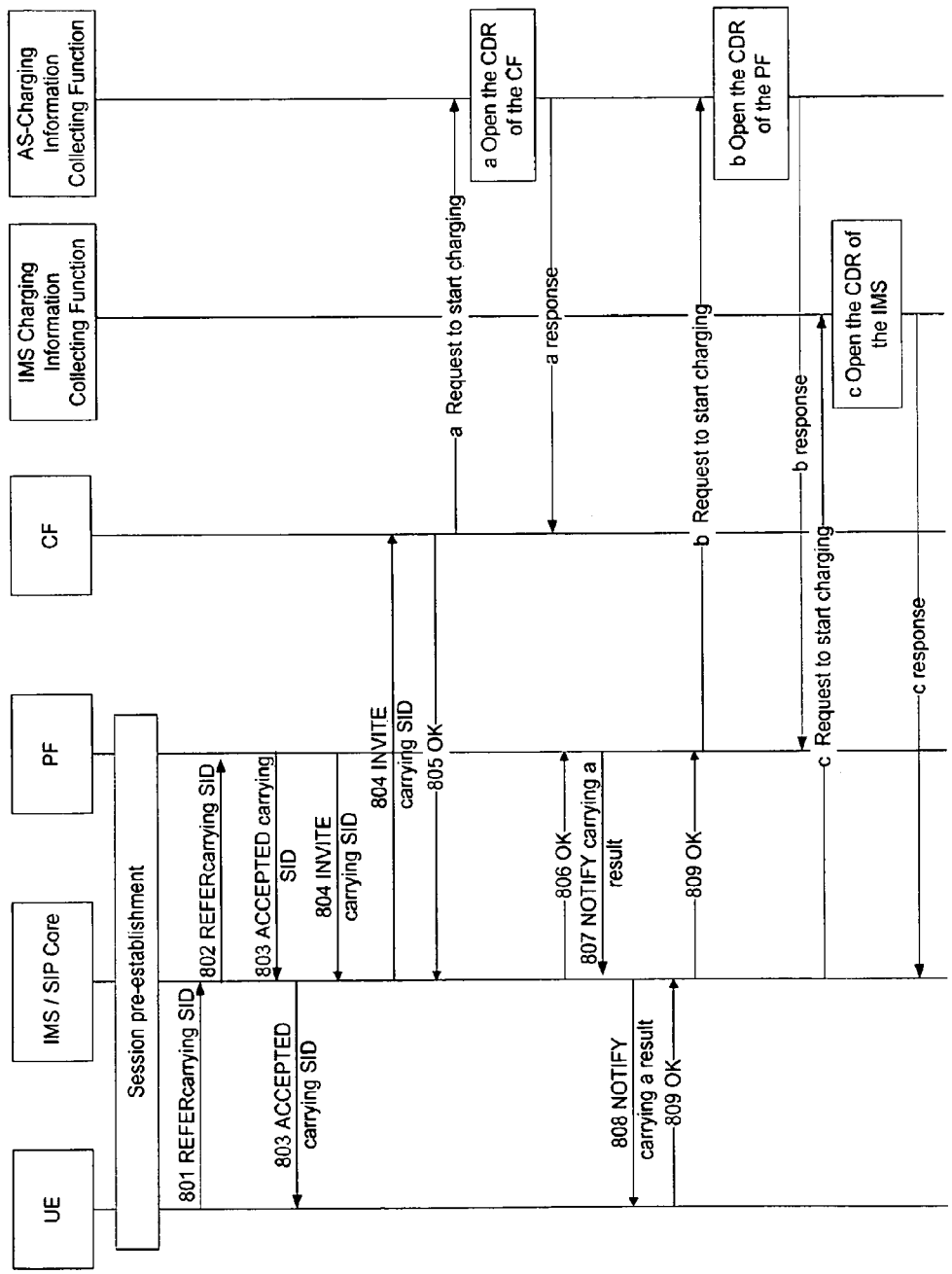
FIG. 8 is a flowchart of a charging correlation process when a user establishing a pre-established session re-enters the session in accordance with an embodiment of the present invention.

FIG. 8 shows a flowchart of a charging correlation process in a case that a user establishing a pre-established session re-enters a session after the user dropping out of the session in accordance with an embodiment of the present invention. The entities involved in this embodiment include: a UE and a PF of the UE, an IMS/SIP Core corresponding to the UE, a CF of the current multi-party service, an AS-charging information collecting function and an IMS charging information collecting function. In this embodiment, the UE, the PF and the CF correspond to a same IMS/SIP Core. As shown in FIG. 8, the process includes as follows.

801-802: The UE and the PF negotiate session parameters before establishing a session. Then the UE sends a session modify request carrying an SID to the PF via the IMS/SIP Core. The session modify request may be carried in a SIP REFER message in this embodiment; however, the present invention is not limited to this.

803: The PF returns a session modify response carrying the SID to the UE via the IMS/SIP Core. The session modify response may be carried in a SIP ACCEPTED message in this embodiment. However, the present invention is not limited to this.

804: The PF sends a join session request carrying the SID to the CF via the IMS/SIP Core to establish a session between the UE and the CF. The join session request may be carried in a SIP INVITE message. However, the present invention is not limited to this.

805-806: The CF returns a join session response carrying the SID to the PF via the IMS/SIP Core. The join session response may be carried in a SIP 200OK or an OK message. However, the present invention is not limited to this.

807-809: The PF sends a join session notification (e.g., a NOTIFY message) carrying a result of the session establishment to the UE via the IMS/SIP Core. The UE returns a join session response (e.g., an OK response) to the PF via the IMS/SIP Core. As such, the session re-entering process is completed.

In FIG. 8, the service layer entities related to the charging correlation process include the PF and the CF. The CF may perform step a after receiving the join session request in 804 and after successful adding the UE into the session. Step a is independent of other following steps and the present invention does not limit the sequence order of performing step a and the steps following 804. The PF may perform step b after receiving the join session response in 809 and similarly, the bearer control layer entity related to the charging correlation process, i.e., the IMS/SIP Core, may perform step c after receiving the response in 809.

Step a may include as follows. The CF requests the AS-charging information collecting function to start charging and sends the CDR of the user requesting to re-enter the session (the UE), which is generated by the CF and carries the SID, to the AS-charging information collecting function. The AS-charging information collecting function opens the CDR of the UE from the CF and starts to record actions that are performed by the UE on the CF and affect an accounting during the current multi-party service. It should be noted that when the user re-enters the session, the opened CDR of the UE is a new CDR instead of the CDR of the UE generated before the UE dropped out of the session. However, the two CDRs have the same SID and may be correlated based on the SID.

Step b may include as follows. The PF requests the AS-charging information collecting function to start charging and sends the CDR of the UE, which is generated by the PF and carries the SID, to the AS-charging information collecting function. The AS-charging information collecting function opens the CDR of the UE from the PF and starts to record actions that are performed by the UE on the PF and affect the accounting during the current multi-party service.

The bearer control layer entity related to the charging correlation process in FIG. 8 is the IMS/SIP Core. The IMS/SIP Core may perform step c after receiving the join session response in 805, and step c is independent of following steps and the present invention does not limit the sequence order of performing step c and the steps following 805.

Step c may include as follows. The IMS/SIP Core requests the IMS charging information collecting function to start charging and sends the CDR of the UE, which is generated by the IMS/SIP Core and carries the SID, to the IMS charging information collecting function. The IMS charging information collecting function opens the CDR of the UE from the IMS/SIP Core and starts to record actions that are performed by the UE on the IMS/SIP Core and affect the accounting during the current multi-party service.

In embodiments shown in FIGS. 4 to 8, the PF and the CF are performed by two separated entities. In practical applications, the PF and the CF may be performed by one entity. In such a case, the essential processes of the embodiments in which the PF and the CF are performed by one entity are similar to the processes shown in FIGS. 4 to 8 and will not be described in detail herein, but are still covered by the protection scope of the invention.

Moreover, the PF and the CF correspond to a same bearer control layer entity e.g., the IMS/SIP Core in FIGS. 4 to 8. In practical applications, the PF and the CF may correspond to different bearer control layer entities. When the PF and the CF are in a same network of an operator, the PF and the CF correspond to a same IMS/SIP Core. When the PF and the CF are in different networks of different operators, the PF and the CF correspond to different IMS/SIP Cores. No matter the PF and the CF correspond to a same IMS/SIP Core or to different IMS/SIP Cores, the method in accordance with embodiments of the present invention is applicable. No matter the PF and the CF correspond to a same bearer control layer entity or to different bearer control layer entities, the method in accordance with embodiments of the present invention is applicable. In one word, the application or service layer entities such as the PF and the CF send/receive messages comprising session modify requests/responses, join session requests/responses, quit session requests/responses, session modify requests/responses and session modify and quit session requests via corresponding IMS/SIP Cores. Detailed processes will not be described herein, but are still covered by the protection scope of the present invention.

In the flowcharts of the above embodiments, the responses returned by the called UE to the CF carry the SID. However, because the CF has learnt the SID of the current service, the responses from the called UE to the CF may not carry the SID.

In the above embodiments, the SID is sent to the AS-charging information collecting function and IMS charging information collecting function, thus the application or service layer of the AS and the bearer control layer of the IMS can function in accordance with the charging correlation scheme provided by embodiments of the present invention. In practical applications, it may be unnecessary for the application or service layer or the bearer control layer to implement the charging correlation process, and in such a case the SID needs not to be sent to the AS-charging information collecting function or the IMS charging information collecting function.

The embodiments of the present invention adopt SIDs as service identifiers, and a description of the SID used in a PoC service is given herein. In a PoC service, SID is assigned by a service control function to a calling/called PoC client. The SID is used to identify a PoC group session in a SIP communication, but is not used in charging data generation processes. A PoC Session Identity (PoC SID) is constructed in a format of a SIP Uniform Resource Identifier (URI) and is sent during a PoC session establishment process to a PoC client in a Contact header field and/or a TBCP CONNECT message. The PoC SID may be assigned and available for a long period, or be assign temporarily. A long term PoC SID is adapted to a pre-arranged PoC group session. A temporary PoC SID is assigned by a server performing CF in the network to a PoC client when the PoC client establishes a PoC session of a PoC service for first time, and is remain valid as long as the PoC service is in progress. When the PoC client establishes a session for another PoC service, the new PoC service is assigned a different PoC SID. However, if the PoC client drops out of a session of a PoC service temporarily and re-enters the same PoC service later, the PoC SID used to the session will remain the same. It can be seen that the PoC SID may be used to identify a PoC service, therefore the PoC SID can also be used to correlate charging information of the service. Such PoC SID cannot be modified easily in transmission and the PoC client cannot modify the PoC SID after receiving the PoC SID, hence it is safe and reliable to use the PoC SID in a charging correlation process.

Embodiments of the present invention also propose a second charging correlation scheme to implement a charging correlation for a plurality of CDRs generated for one user in a multi-service comprising a plurality of sub-services. The charging correlation scheme provides two ways to implement this charging correlation.

According to a first way, a service control function assigns a multi-service identifier for a current multi-service and assigns a sub-service identifier to each of the sub-services included in the current multi-service. The multi-service identifier and the sub-service identifiers are sent to a charging system. The charging system correlates CDRs of a sub-service based on the sub-service identifier of the sub-service, and correlates CDRs of the plurality of sub-services based on the multi-service identifier.

According to a second way, a service control function just assigns a multi-service identifier for a current multi-service. The multi-service identifier is sent to a charging system which correlates the CDRs of a plurality of sub-services of the current multi-service based on the multi-service identifier.

In a multi-service, a user may establish one or a plurality of sessions in each of the sub-services and a CDR is generated for each of the sessions of the user. Different methods may be used to correlate the CDRs based on the multi-service identifier. The CDRs to be correlated based on the multi-service identifier may be: CDRs corresponding to a plurality of sub-services (or a plurality of sessions of a plurality of sub-services) established for one user in the current multi-service, or CDRs corresponding to a plurality of sub-services (or a plurality of sessions of a plurality of sub-services) established for a part of users or all users in the current multi-service. The way of correlating CDRs may be chosen based on special correlation policy applied. The contents and forms of correlation policies are not the technical problem to be solved by the present invention and will not be described further herein.

In a multi-service, a sub-service corresponds to a sub-service server. A service control function controls the sub-service servers to initiate, modify and end sub-services in order to initiate, modify and end the multi-service. According to the first way described above, for a sub-service, after the service control function assigns the multi-service identifier and the sub-service identifiers corresponding to sub-services, the service control function sends the multi-service identifier and a sub-service identifier corresponding to a sub-service to a sub-service server corresponding to the sub-service. The sub-service server generates CDRs for the sub-service and sends the CDRs, the received multi-service identifier and the sub-service identifier to an AS-charging information collecting function of the sub-service server. The AS-charging information collecting function forwards the received multi-service identifier, the sub-service identifier and the CDRs to a billing center. The billing center correlates the CDRs generated by one sub-service server based on the sub-service identifier, and further correlates CDRs generated the sub-service servers based on the multi-service identifier. According to the second way described above, after assigning the multi-service identifier, the service control function sends the multi-service identifier to each sub-service server corresponding to each sub-service. A sub-service server generates CDRs for each corresponding sub-service and sends the received multi-service identifier and the CDRs generated to the AS-charging information collecting function of the sub-service server. The AS-charging information collecting function forwards the received multi-service identifier and the CDRs to the billing center. The billing center correlates the CDRs from different sub-service servers based on the multi-service identifier.

When the charging correlation scheme is applied to the application or service layer, the charging information collecting function includes the AS-charging information collecting functions corresponding to the sub-service servers. The scheme can further be applied to the bearer control layer, and in such a case the charging information collecting function includes bearer control layer-charging information collecting functions of the bearer control layer entities corresponding to the sub-service servers. The bearer control layer entities corresponding to the sub-service servers are used to implement the service control functions. The bearer control layer entities corresponding to the sub-service servers are further used to record the multi-service identifier or a combination of the multi-service identifier and a sub-service identifier and generate CDRs for corresponding sub-services. The bearer control layer entities send the multi-service identifier or the combination of the multi-service identifier and a sub-service identifier, and the CDRs to the bearer control layer-charging information collecting function of the bearer control layer entities. The AS-charging information collecting function and the bearer control layer-charging information collecting function send the received CDRs, and the multi-service identifier or the combination of the multi-service identifier and a sub-service identifier to the billing center. In FIGS. 9A through 10B, the application or service layer is taken as an example. When the present invention is applied only to the bearer control layer, charging correlation process involves UEs, service control functions, bearer control layer entities corresponding to sub-service servers, bearer control layer-charging information collecting functions and a billing center, without involving sub-service servers and AS-charging information collecting functions. Embodiments that the bearer control layer is employed are not described in detailed herein, but are still covered by the protection scope of the present invention. When the multi-service identifier or the combination of the multi-service identifier and the sub-service identifier is sent to an AS-charging information collecting function or to bearer control layer-charging information collecting function, the multi-service identifier or the combination of the multi-service identifier and the sub-service identifiers may be carried in CDRs.

Moreover, a multi-service usually includes a primary service and supplementary services. That is, a multi-service includes a sub-service as the primary service and at least one sub-service as the supplementary service. The sub-service server and sub-service identifier corresponding to the primary service are called primary server and primary service identifier respectively, and the sub-service server and sub-service identifier corresponding to a supplementary service are called supplementary server and supplementary service identifier respectively. The service control function may be performed by a separated entity or be performed by the primary server. The multi-service identifier assigned to the multi-service may be identical with or different from the sub-service identifiers. When the multi-service includes a primary service and at least one supplementary service, the multi-service identifier may be identical with the primary service identifier.

The embodiments of the present invention are mainly applied to session-based application or services such as multi-party services, the session IDs (SIDs) corresponding to different services are already applied to conventional session-based services. The existing SIDs may be used as service identifiers to correlate a plurality of CDRs. Also new identifiers may be defined as the service identifiers. Usually information exchanged among entities on the application or service layer is forwarded via corresponding bearer control layer entities. For example, servers performing PF of the multi-party service, the server performing CF and the UEs exchange information via corresponding bearer control layer entities such as an IMS/SIP Core network (IMS/SIP Core). At the same time, the network functions in the IMS/SIP Core may also generate CDRs for the current application or service in order to implement the charging correlation process on the bearer control layer. Each sub-service server of a sub-service corresponds to a bearer control layer entity, and the bearer control layer entity adapted to bear the sub-service server.

At current, mainstream multi-services include: combinations of a plurality of multi-party services, a combination of a multi-party service and a Location Service or a combination of a multi-party service and a Presence Service. The second charging correlation scheme of the present invention is described hereinafter with reference to a multi-service comprising two multi-party services, e.g. a PoC service and a Conference service. A server performing CF and a server performing PF in the multi-party service are used to provide the services, yet the second charging correlation scheme focuses on the charging correlation of the sub-services, not internal flows of the sub-services. Therefore, for the sake of simplicity, the service processes between the server performing CF and the server performing PF in the multi-party service are omitted, and the server performing CF and the server performing PF are regarded as sub-service servers of the multi-party service. A sub-service server corresponding to the PoC service is called a PoC server and a sub-service server corresponding to the Conference service is called a Conference server. In embodiments of the present invention, the service control function is implemented by a PoC server.

Figure 9A:
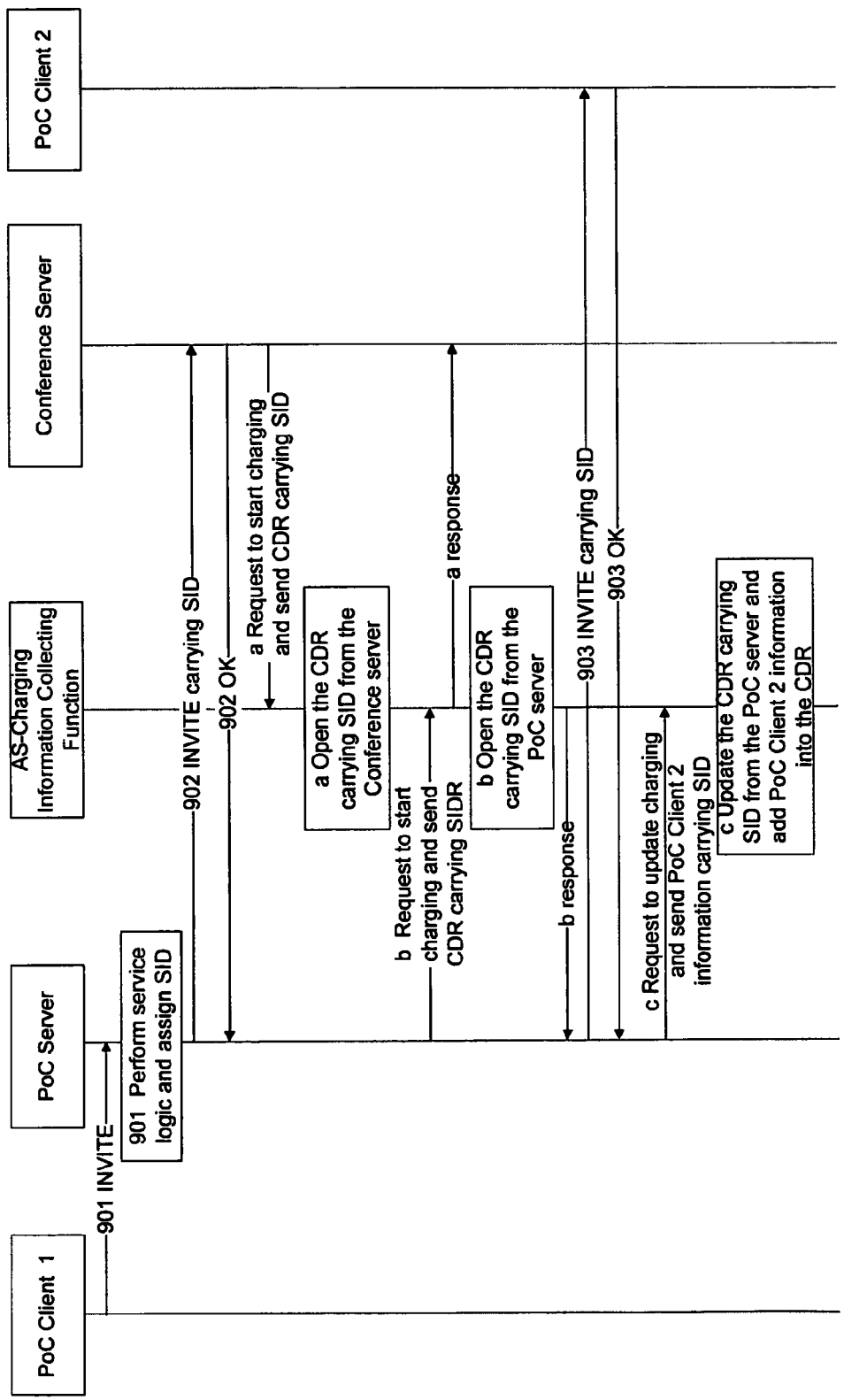
FIG. 9A-B is a flowchart of a charging correlation process for a multi-service in accordance with an embodiment of the present invention.
Figure 9B:
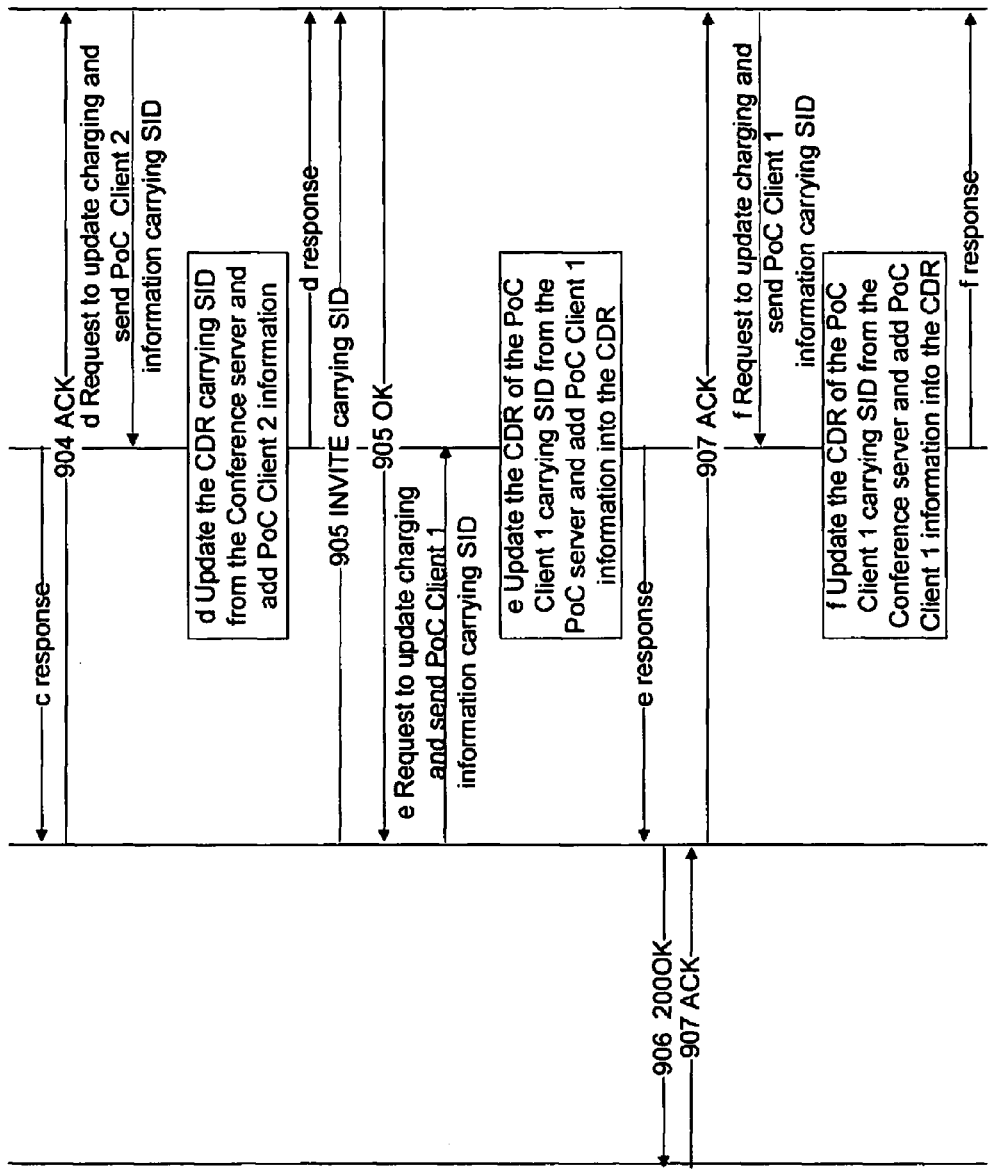

FIGS. 9A and 9B show a flowchart of a charging correlation process for a multi-service in accordance with an embodiment of the present invention. In this embodiment, the service control function assigns a multi-service identifier. In this embodiment, the SID adapted to an individual PoC service in a conventional PoC service is used as the multi-service identifier. The entities involved in the embodiment include: PoC Client 1, PoC Client 2, a PoC server, a Conference server and a charging information collecting function. In this embodiment, PoC Client 1 initiates a multi-service and adds PoC Client 2 into the multi-service. As shown in FIGS. 9A and 9B, the process includes as follows.

901: PoC Client 1 sends a session establishment request to the PoC server to initiate a PoC service. The session establishment request carries information of PoC Client 2, instructs to establish a multi-service comprising a Conference service and to add PoC Client 2 into the multi-service. The PoC server implements PoC service logic. A service control function in the PoC server assigns a multi-service identifier to the current multi-service. The multi-service identifier is the SID assigned to the PoC service. The session establishment request may be carried in a SIP INVITE message. However, the present invention is not limited to this.

902: The service control function in the PoC server sends the session establishment request (e.g., an INVITE message) carrying the SID to the Conference server to initiate a Conference service. The Conference server returns a session establishment response (e.g., a 200OK message). The session establishment request carries the information of PoC Client 2 to indicate that PoC Client 2 needs to be added into the Conference service.

After 902, both the PoC service and the Conference service are originated and the PoC server and the Conference server will perform step b and a respectively to generate CDRs of the PoC service and CDRs of the Conference service on the AS-charging information collecting function.

Step a may include as follows. The Conference server generates a CDR for the current Conference service, requests the AS-charging information collecting function to start charging, and sends the CDR that is generated by the Conference server and carries the SID to the AS-charging information collecting function. The AS-charging information collecting function opens the CDR from the Conference server, starts to record actions which are performed on the Conference server by users of the Conference service and affect the accountings, and returns a response to the Conference server.

Step b may include as follows. The PoC server generates a CDR for the current PoC service, requests the AS-charging information collecting function to start charging, and sends the CDR that is generated by the PoC server and carries the SID to the AS-charging information collecting function. The AS-charging information collecting function opens the CDR from the PoC server, starts to record actions which are performed on the PoC server by users of the PoC service and affect the accountings, and returns a response to the PoC server.

903: The PoC server sends a join session request carrying the SID to PoC Client 2 to add PoC Client 2 into the current PoC service. PoC Client 2 returns a join session response to the PoC server to indicate that PoC Client 2 has successfully joined the current PoC service.

After the PoC server has successfully added PoC Client 2 into the current PoC service, the information of PoC Client 2 needs to be recorded in the CDR of the current PoC service on the AS-charging information collecting function; therefore step c needs to be performed. Step c may include as follows. The PoC server requests the AS-charging information collecting function to update the charging, and sends the CDR carrying the SID of PoC Client 2 to the AS-charging information collecting function. The AS-charging information collecting function updates the CDR of PoC Client 2 that carries the SID from the PoC server, records the information of PoC Client 2 in the CDR, starts to record actions that are performed by PoC Client 2 on the PoC server and affect the accounting during the current multi-service, and returns a response to the PoC server.

904: The PoC server sends an acknowledgement (ACK) to the Conference server after PoC Client 2 has successfully joined the current PoC service, in order to indicate that it is ready for the Conference server to add PoC Client 2 into the service. The Conference server performs operations similar to the operations in 903 to add PoC Client 2 into the current Conference service.

The information of PoC Client 2 needs to be recorded in the CDR of the current Conference service on the AS-charging information collecting function, therefore step d needs to be performed. Step d may include as follows. The Conference server requests the AS-charging information collecting function to update the charging, and sends the CDR carrying the SID of PoC Client 2 to the AS-charging information collecting function. The AS-charging information collecting function updates the CDR of PoC Client 2 that carries the SID from the Conference server, records the information of PoC Client 2 in the CDR, starts to record actions that are performed by PoC Client 2 on the Conference server and affect the accounting during the current multi-service, and returns a response to the Conference server.

905-906: The PoC server sends a join session request (e.g., an INVITE message) carrying the SID to the Conference server, and the Conference server returns a join session response (e.g., a 200OK message). The join session request carries information of PoC Client 1 to indicate that PoC Client 1 needs to be added into the Conference service. At the same time, the PoC server adds PoC Client 1 into the current PoC service and returns a join session response (e.g., a 200OK message) to PoC Client 1.

After the PoC server has successfully added PoC Client 1 into the current PoC service, the information of PoC Client 1 needs to be recorded in the CDR of the current PoC service on the AS-charging information collecting function; therefore step e needs to be performed. Step e may include as follows. The PoC server requests the AS-charging information collecting function to update the charging, and sends the CDR carrying the SID of PoC Client 1 to the AS-charging information collecting function. The AS-charging information collecting function updates the CDR of PoC Client 1 carrying the SID from the PoC server, records the information of PoC Client 1 in the CDR, starts to record actions that are performed by PoC Client 1 on the PoC server and affect the accounting during the current multi-service, and returns a response to the PoC server.

907: The PoC server sends an acknowledgement (ACK) to the Conference server after PoC Client 1 has successfully joined the current PoC service, in order to indicate that it is ready for the Conference server to add PoC Client 1 into the service. The Conference server performs operations similar to the operations in 903 to add PoC Client 1 into the current Conference service.

The information of PoC Client 1 needs to be recorded in the CDR of the current Conference service on the AS-charging information collecting function, therefore step f needs to be performed. Step f may include as follows. The Conference server requests the AS-charging information collecting function to update the charging, and sends the CDR carrying the SID of PoC Client 1 to the AS-charging information collecting function. The AS-charging information collecting function updates the CDR of PoC Client 1 carrying the SID from the Conference server, records the information of PoC Client 1 in the CDR, starts to record actions that are performed by PoC Client 1 on the Conference server and affect the accounting during the current multi-service, and returns a response to the Conference server.

After the processes described above, the CDRs of the sub-services, which are saved in the AS-charging information collecting function, carry the multi-service identifier, therefore, the CDRs of the sub-services may be correlated based on the multi-service identifier.

Figure 10A:
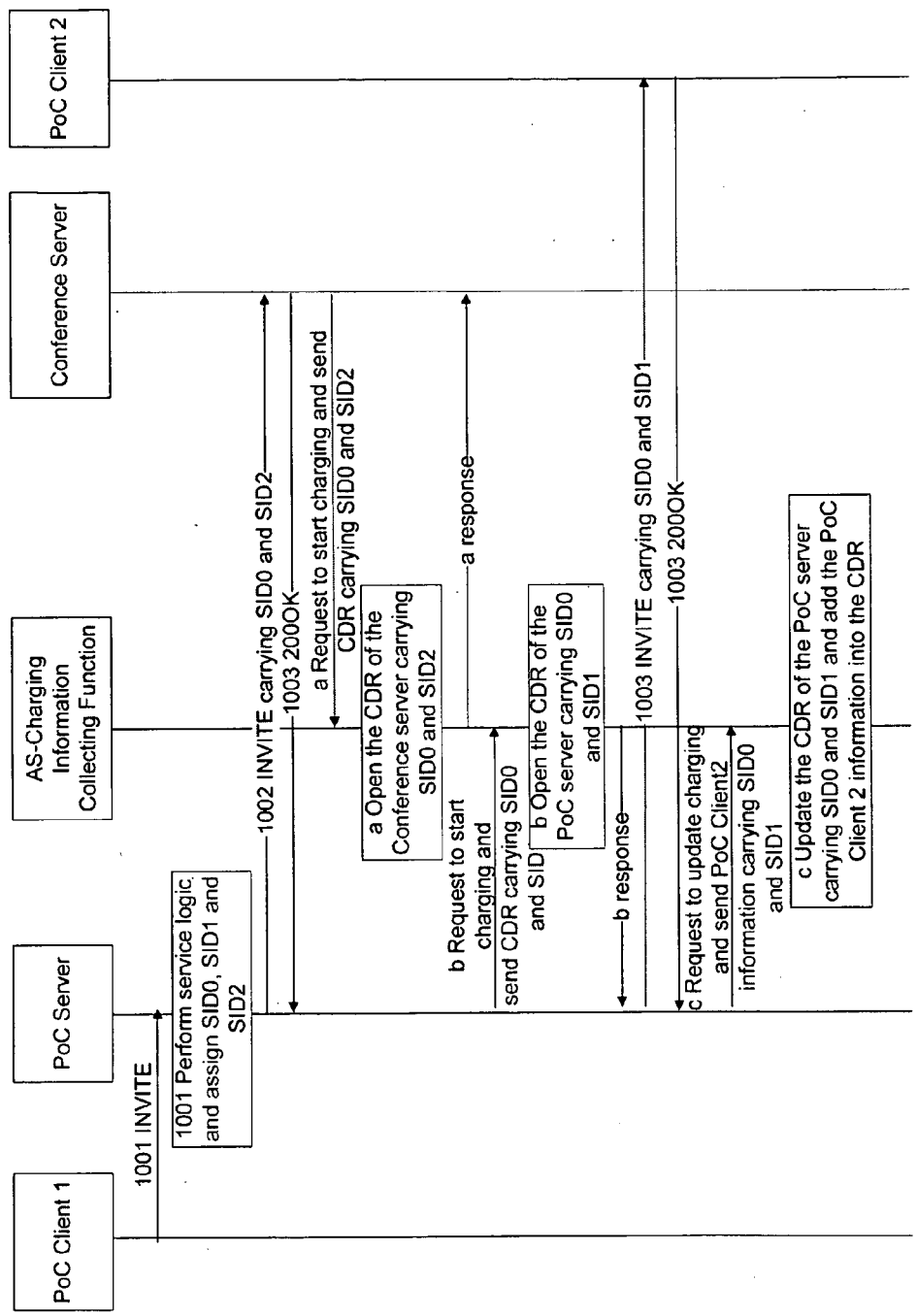
FIGS. 10A-B is a flowchart of a charging correlation process for a multi-service in accordance with an embodiment of the present invention.
Figure 10B:
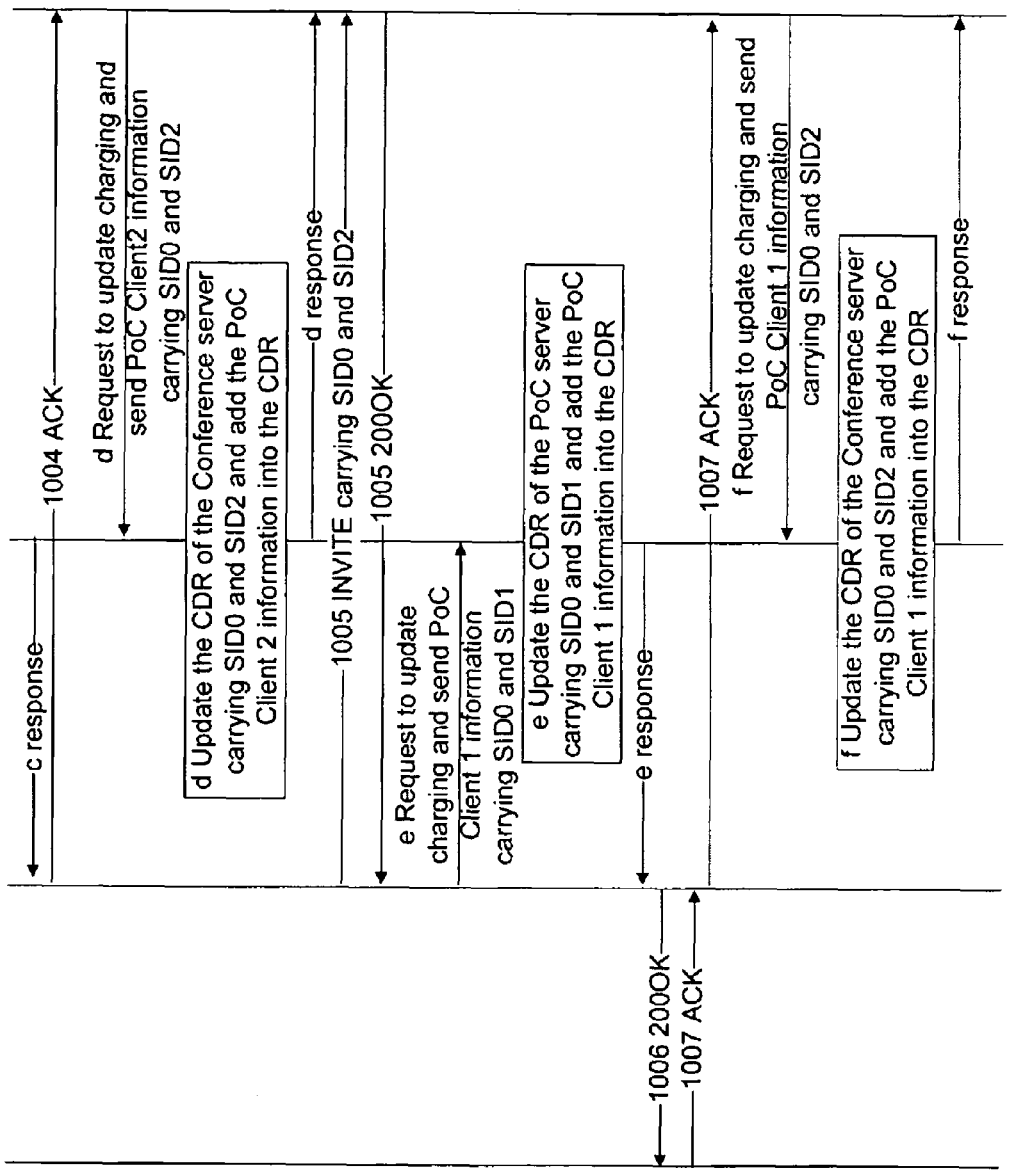

FIGS. 10A and 10B show a flowchart of a charging correlation process for a multi-service in accordance with an embodiment of the present invention. In this embodiment, the service control function assigns a multi-service identifier for the multi-service and assigns a sub-service identifier to each sub-service. In this embodiment, the sub-service identifier of the PoC service adopts the SID assigned for an individual PoC service in the conventional PoC service, called SID1. The sub-service identifier of the Conference service adopts the SID assigned for an individual Conference service in the conventional Conference service, called SID2. The entities involved in this embodiment include: PoC Client 1, PoC Client 2, a PoC server, a Conference server and a charging information collecting function. In this embodiment, PoC Client 1 initiates a multi-service and adds PoC Client 2 into the multi-service. As shown in FIGS. 10A and 10B, the process includes as follows.

1001: PoC Client 1 sends a session establishment request to the PoC server to initiate a PoC service. The session establishment request carries information of PoC Client 2 and instructs to establish a multi-service comprising a Conference service and to add PoC Client 2 into the multi-service. The PoC server implements PoC service logic. A service control function in the PoC server assigns a multi-service identifier for the current multi-service, assigns a sub-service identifier to the PoC service and assigns a sub-service identifier to the Conference service.

The sub-service identifier of the PoC service adopts the SID assigned to the PoC service, called SID1; the sub-service identifier of the Conference service adopts the SID assigned to the Conference service, called SID2; and the multi-service identifier adopts the SID assigned to the multi-service, called SID0. The session establishment request may be carried in a SIP INVITE message in this embodiment. However, the present invention is not limited to this.

1002: The service control function in the PoC server sends the session establishment request (e.g., an INVITE message) carrying the SID0 and SID2 to the Conference server to initiate a Conference service. The Conference server returns a session establishment response (e.g., a 200OK message). The session establishment request carries information of PoC Client 2 to indicate that PoC Client 2 needs to be added into the Conference service.

After 1002, both the PoC service and the Conference service are originated and the PoC server and the Conference server will perform step b and step a respectively to generate CDRs of the PoC service and CDRs of the Conference service on the AS-charging information collecting function.

Step a may include as follows. The Conference server generates a CDR for the current Conference service, requests the AS-charging information collecting function to start charging, and sends the CDR that is generated by the Conference server and carries the SID0 and SID2 to the AS-charging information collecting function. The AS-charging information collecting function opens the CDR from the Conference server, starts to record actions of the Conference service which are performed on the Conference server by users and affect the accounting, and returns a response from the AS-charging information collecting function to the Conference server.

Step b may include as follows. The PoC server generates a CDR for the current PoC service, requests the AS-charging information collecting function to start charging, and sends the CDR that is generated by the PoC server and carries the SID0 and SID1 to the AS-charging information collecting function. The AS-charging information collecting function opens the CDR from the PoC server, starts to record actions of the PoC service which are performed on the PoC server by users and affect the accounting, and returns a response to the PoC server.

1003: The PoC server sends a join session request carrying the SID0 and SID1 to PoC Client 2 to add PoC Client 2 into the current PoC service. PoC Client 2 returns a join session response to the PoC server to indicate that PoC Client 2 has successfully joined the current PoC service.

After the PoC server has successfully added PoC Client 2 into the current PoC service, the information of PoC Client 2 needs to be recorded in the CDR of the current PoC service on the AS-charging information collecting function; therefore step c needs to be performed. Step c may include as follows. The PoC server requests the AS-charging information collecting function to update the charging, and sends the CDR carrying the SID0 and SID1 of PoC Client 2 to the AS-charging information collecting function. The AS-charging information collecting function updates the CDR of PoC Client 2 carrying the SID0 and SID1 from the PoC server, records the information of PoC Client 2 in the CDR, starts to record actions that are performed by PoC Client 2 on the PoC server and affect the accounting during the current multi-service, and returns a response to the PoC server.

1004: The PoC server sends an acknowledgement (ACK) to the Conference server after PoC Client 2 has successfully joined the current PoC service, in order to indicate that it is ready for the Conference server to add PoC Client 2 into the service. The Conference server performs operations similar to the operations in 1003 to add PoC Client 2 into the current Conference service.

The information of PoC Client 2 needs to be recorded in the CDR of the current Conference service on the AS-charging information collecting function, therefore step d needs to be performed. Step d may include as follows. The Conference server requests the AS-charging information collecting function to update the charging, and sends the CDR carrying the SID0 and SID2 of PoC Client 2 to the AS-charging information collecting function. The AS-charging information collecting function updates the CDR of PoC Client 2 carrying the SID0 and SID2 from the Conference server, records the information of PoC Client 2 in the CDR, starts to record actions that are performed by PoC Client 2 on the Conference server and affect the accounting during the current multi-service, and returns a response to the Conference server.

1005-1006: The PoC server sends a join session request (e.g., an INVITE message) carrying the SID0 and SID2 to the Conference server and the Conference server returns a join session response (e.g., a 200OK message). The join session request carries information of PoC Client 1 to indicate that PoC Client 1 shall join the Conference service. At the same time, the PoC server adds PoC Client 1 into the current PoC service and returns a join session response (e.g., a 200OK message) to PoC Client 1.

After the PoC server has successfully added PoC Client 1 into the current PoC service, the information of PoC Client 1 needs to be recorded in the CDR of the current PoC service on the AS-charging information collecting function; therefore step e needs to be performed. Step e may include as follows. The PoC server requests the AS-charging information collecting function to update the charging, and sends the CDR carrying the SID0 and SID1 of PoC Client 1 to the AS-charging information collecting function. The AS-charging information collecting function updates the CDR of PoC Client 1 carrying the SID0 and SID1 from the PoC server, records the information of PoC Client 1 in the CDR, starts to record actions that are performed by PoC Client 1 on the PoC server and affect the accounting during the current multi-service, and returns a response to the PoC server.

1007: The PoC server sends an acknowledgement (ACK) to the Conference server after PoC Client 1 has successfully joined the current PoC service, in order to indicate that it is ready for the Conference server to add PoC Client 1 into the service. The Conference server performs operations similar to the operations in 1003 to add PoC Client 1 into the current Conference service.

The information of PoC Client 1 needs to be recorded in the CDR of the current Conference service on the AS-charging information collecting function; therefore step f needs to be performed. Step f may include as follows. The Conference server requests the AS-charging information collecting function to update the charging, and sends the CDR carrying the SID0 and SID2 of PoC Client 1 to the AS-charging information collecting function. The AS-charging information collecting function updates the CDR of PoC Client 1 carrying the SID0 and SID2 from the Conference server, records the information of PoC Client 1 in the CDR, starts to record actions that are performed by PoC Client 1 on the Conference server and affect the accounting during the current multi-service, and returns a response to the Conference server.

After the processes described above, CDRs of the sub-services in the AS-charging information collecting function have the multi-service identifier and the sub-service identifiers corresponding to the sub-services. Therefore the CDRs of a sub-service may be correlated based on the sub-service identifier of the sub-service, and the CDRs of different sub-services, which have already been correlated based on the sub-service identifiers, are then correlated based on the multi-service identifier.

FIGS. 9A to 10B illustrate the second charging correlation scheme of the present invention which is applied to the application or service layer. When the charging correlation scheme is applied to the bearer control layer, the entities involved include: a bearer control layer entity corresponding to the sub-service servers, a bearer control layer-charging information collecting function and the UEs. The bearer control layer entities corresponding to the sub-service servers may record the multi-service identifier and/or sub-service identifiers when the multi-service identifier and/or sub-service identifiers are received by the sub-service servers, generate CDRs and send the received multi-service identifier and/or sub-service identifiers and the CDRs to corresponding bearer control layer-charging information collecting functions. The processes in which the charging correlation scheme is applied to the bearer control layer is similar to that in FIGS. 9A to 10B and will not be described in detail herein, but is covered by the protection scope of the present invention.

Moreover, the charging correlation process may be variable based on different multi-services to be charged for, yet the charging correlation process will always be in accordance with the two ways of implementing the second charging correlation scheme provided by the above embodiments of the present invention. Because different multi-services may include various sub-services, the charging flow may vary in different ways. For example, the service control function may send the multi-service identifier and the sub-service identifiers to the primary server and the supplementary servers in two ways: 1) the service control function may send a primary service identifier when initiating a primary service, or when setting up the primary service, or when setting up all supplementary services, or when setting up the current multi-service; 2) the service control function may send the multi-service identifier when initiating the primary service, or when setting up the primary service, or when setting up all supplementary services, or when setting up the current multi-service; 3) the service control function may send a supplementary service identifier when initiating corresponding supplementary service, or when setting up corresponding supplementary service, or when setting up the current multi-service; 4) the service control function may send the multi-service identifier when initiating each of the supplementary services, or when setting up each of the supplementary services, or when setting up the current multi-service. Various charging correlation processes for various multi-services will not be listed herein. However, and any charging correlation process for multi-service that is in accordance with the principles of the present invention falls in the scope of the present invention.

In embodiments of the present invention, a sub-service included in a multi-service may be any application or service. A multi-service may include sub-services such as PoC service, Conference service, Location service, Presence service and any combination of the above application or services.

Figure 11:
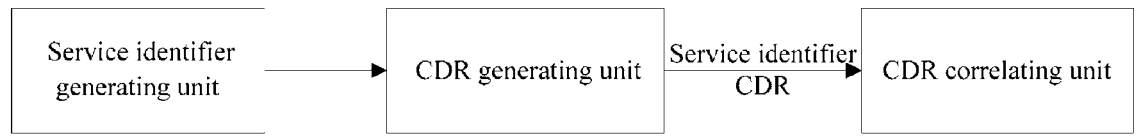
FIG. 11 is a structure diagram of a system for implementing a charging correlation of an application or service in accordance with an embodiment of the present invention.

A charging correlation system for an application or service is further proposed. FIG. 11 is a structure diagram of a system for implementing a charging correlation of an application or service in accordance with an embodiment of the present invention. In an embodiment of the present invention, the system includes a service identifier generating unit, a CDR generating unit and a CDR correlating unit.

The service identifier generating unit is adapted to assign a service identifier to a current application or service and send the service identifier to the CDR generating unit. The CDR generating unit is adapted to receive the service identifier from the service identifier generating unit, generate a plurality of CDRs for the current application or service and send the received service identifier and the CDRs generated to the CDR correlating unit. The CDR correlating unit is adapted to receive the CDRs and the service identifier from the CDR generating unit and correlate the CDRs of the current application or service based on the service identifier.

The service identifier generating unit may be a separated entity or be integrated into the service control function of the application or service. When the system is applied to a single-service, the service control function is an AS of the current application or service, e.g., a server performing CF for a multi-party service such as PoC service and Conference service. When the system is applied to a multi-service, the service control function is a service control function of the current multi-service. The service control function may be integrated into an AS of a sub-service (i.e., a sub-service server) of the multi-service or be integrated into a server performing CF for the multi-party service such as the PoC service and the Conference service. The CDR correlating unit may also be a separated entity or be integrated into a charging system.

Moreover, the CDR generating unit may further add the received service identifier into the CDRs generated so that the CDRs and the service identifier may be sent.

In the system provided by embodiments of the present invention, the units may function according to the processes described in the preceding embodiments, and detailed functions of the units are not described anymore.

A charging correlation system is also proposed by embodiments of the present invention. The charging correlation system includes a service control function entity and a charging system. The service control function entity is adapted to assign a service identifier to a current application or service and the charging system is adapted to correlate at least one CDR generated for the application or service based on service identifier assigned by the service control function entity. The charging system may further include charging information collecting function entity and a billing center. The charging information collecting function entity is adapted to receive the service identifier from the service control function entity and collect at least one CDR, and the billing center is adapted to correlate at least one CDR based on the service identifier.

The service control function entity may be an AS adapted to generate at least one CDR for the application or service. The system may further include a bearer control layer entity adapted to record the service identifier assigned by the service control function entity and generate at least one CDR. In such a case the charging information collecting function entity further includes an AS-charging information collecting function entity and a bearer control layer-charging information collecting function entity. The AS-charging information collecting function is adapted to receive the service identifier from the service control function entity (i.e., the AS) and the at least one CDR generated by the service control function entity, and the bearer control layer-charging information collecting function entity is adapted to receive the service identifier from a bearer control entity and the at least one CDR generated by the bearer control layer entity. Therefore the billing center may correlate the at least one CDR from the bearer control layer-charging information collecting function entity based on the service identifier, or correlate the at least one CDR from the AS-charging information collecting function entity based on the service identifier, or correlate the at least one CDR from the bearer control layer-charging information collecting function entity and the at least one CDR from the AS-charging information collecting function entity based on the service identifier.

When the application or service is a multi-party service, the service control function entity is a server performing CF. At least one server performing PF may further be included. The bearer control layer entity may include a bearer control layer entity corresponding to the server performing CF, and at least one bearer control layer entity corresponding to the server performing PF. The bearer control layer entity corresponding to the server performing CF is adapted to bear the server performing CF, and a bearer control layer entity corresponding to a server performing PF is adapted to bear the server performing PF. The AS-charging information collecting function entity may further include an AS-charging information collecting function entity of the server performing CF and at least one AS-charging information collecting function entity of the server performing PF. The bearer control layer-charging information collecting function entity may further include a bearing control layer charging information collecting function entity of the bearer control layer entity corresponding to the server performing CF and at least one bearer control layer-charging information collecting function entity of a bearer control layer entity corresponding to a server performing PF.

When the application or service is a multi-service comprising a plurality of sub-services, the system may further include sub-service servers of a plurality of sub-services. The bearer control layer entity may further include at least one bearer control layer entity corresponding to the plurality of sub-service servers. The bearer control layer entity corresponding to the sub-service servers is adapted to bear the sub-service servers. The AS-charging information collecting function entity may further include AS-charging information collecting function entities of corresponding sub-service servers, and the bearer control layer-charging information collecting function entity may further include bearer control layer-charging information collecting function entities of corresponding bearer control layer entities of sub-service servers.

The functions of the components of the system in various cases have been given in the preceding description and will not be explained further herein, but are still covered by the protection scope of the present invention.

A billing center is also proposed in embodiments of the present invention. The billing center may include a first module adapted to receive a service identifier of the current application or service and receive at least one CDR generated for the application or service, and a second module adapted to correlate at least one CDR based on the service identifier received by the first module and generate a bill. The CDR received by the first module may be CDR generated by an AS and CDR generated by a bearer control layer entity. The second module may correlate the CDRs generated by the AS based on the service identifier, or correlate the CDRs generated by the bearer control layer entity based on the service identifier, or correlate the CDRs generated by the AS and the CDRs generated by the bearer control layer entity together based on the service identifier.

A charging data record generating apparatus is also proposed in embodiments of the present invention. The charging data record generating apparatus may include a first module and a second module. The first module is adapted to receive a service identifier assigned to the current application or service and the second module is adapted to generate for the application or service at least one CDR carrying the service identifier received by the first module and to export the at least one CDR. The charging data record generating apparatus may be an AS or a bearer control layer entity in embodiments of the present invention.

In one word, in embodiments of the present invention, a plurality of CDRs generated for a user in a service may be correlated for charging, and the CDRs of a plurality of sub-services in a multi-service of the user can also be correlated for charging. Furthermore, the embodiments of the present invention is easy to implement and can improve accuracy of correlated charging. Therefore the methods and apparatus proposed in the embodiments of the present invention are beneficial in supplementing and improving the conventional application or service charging correlation process (especially the charging correlation process of a multi-party service).

The previous description of the disclosed embodiments is provided to enable those skilled in the art to make or use the present invention. Various modifications to these embodiments will be readily apparent to those skilled in the art and generic principles defined herein may be applied to other embodiments without departing from the scope of the invention. Thus, the present invention is not intended to be limited to the embodiments shown herein but is to be accorded the widest scope consistent with the principles and novel features disclosed herein.

What is claimed is:

1. A method for charging correlation, comprising:
receiving, by a sub-service server, a multi-service identifier of a multi-service and a sub-service identifier of a sub-service of the multi-service from a service control function entity, and a service identifier assigned for an application or service, wherein the multi-service identifier and the sub-service identifier are assigned by the service control function entity for the multi-service and the sub-service of the multi-service respectively, the multi-service comprises at least two sub-services each corresponding to one sub-service server;
correlating Charging Data Records (CDRs) generated for a plurality of sessions of a same user, a plurality of sessions of a part of or all users or a plurality of sub-services in the application or service based on the service identifier,
generating, by the sub-service server, a CDR for the sub-service that corresponds to the sub-service identifier; and
sending, by the sub-service server, the CDR, the multi-service identifier and the sub-service identifier to a billing center via a charging information collecting function entity corresponding to the sub-service server, so as to enable the billing center to correlate the CDR with the sub-service identifier, and to correlate the correlated CDR with the multi-service identifier.

2. The method according to claim 1, wherein the charging information collecting function entity comprises:

a bearer control layer charging information collecting function entity of a bearer control layer entity that corresponding to the sub-service server, and the bearer control layer entity is adapted to bear the bearer control layer;

the method further comprises:

sending, by the sub-service server, the CDR, the multi-service identifier and the sub-service identifier to the bearer control layer entity, so as to enable the bearer control layer entity to record, and to send the CDR, the multi-service identifier and the sub-service identifier to the billing center via the bear control layer charging information collecting function entity.

3. The method according to claim 2, wherein the multi-service comprises at least one of combinations of a plurality of multi-party services, a combination of a multi-party service and a Location Service and a combination of a multi-party service and a Presence Service.

4. The method according to claim 2, wherein the multi-service identifier and the sub-service identifier are carried in the CDR by the sub-service server for transmission.

5. A method for charging correlation, comprising:

receiving, by a sub-service server, a multi-service identifier of a multi-service from a service control function entity, and a service identifier assigned for an application or service, wherein the multi-service identifier is assigned by the service control function entity for the multi-service and the multi-service comprises at least two sub-services each corresponding to one sub-service server;

correlating Charging Data Records (CDRs) generated for a plurality of sessions of a same user, a plurality of sessions of a part of or all users or a plurality of sub-services in the application or service based on the service identifier, generating, by the sub-service server, a CDR for the sub-service that corresponds to the sub-service identifier; and sending, by the sub-service server, the CDR and the multi-service identifier to a billing center via a charging information collecting function entity corresponding to the sub-service server to enable the billing center to correlate the CDR with the multi-service identifier.

6. The method according to claim 4, wherein the charging information collecting function entity comprises:

a bearer control layer charging information collecting function entity of a bearer control layer entity that corresponding to the sub-service server; and the bearer control layer entity is adapted to bear the bearer control layer;

the method further comprises:

sending, by the sub-service server, the CDR and the multi-service identifier to the bearer control layer entity, so as to enable the bearer control layer entity to record, and to send the CDR and the multi-service identifier to the billing center via the bearer control layer charging information collecting function entity.

7. The method according to claim 6, wherein the multi-service comprises at least one of combinations of a plurality of multi-party services, a combination of a multi-party service and a Location Service and a combination of a multi-party service and a Presence Service.

8. The method according to claim 6, wherein the multi-service identifier is carried in the CDR by the sub-service server for transmission.

9. A method for charging correlation, comprising:

receiving, by a service control function entity, a join session request, which carries a service identifier assigned for an application or service, from a Participating Function (PF) entity, wherein the service control function entity performs a controlling function in a multi-party service, the join session request is sent by a User Equipment (UE) intent to re-enter a multi-party service to the PF entity;

generating and sending, by the service control function entity, a first Charging Data Record (CDR) for the UE and the service identifier to a billing center via a charging information collecting function entity, to enable the billing center to correlate the first CDR and a CDR of the UE generated for the UE based on the service identifier before the UE dropped out of the multi-party service, wherein the CDRs generated for a plurality of sessions of a same user, a plurality of sessions of a part of or all users or a plurality of sub-services in the application or service based on the service identifier.

10. The method according to claim 9, further comprising:

generating and sending, by the PF entity, a second CDR for the UE and the service identifier to the billing center via the charging information collecting function entity; and correlating, by the billing center, the second CDR and the first CDR, and CDR of the UE generated for the UE based on the service identifier before the UE dropped out of the multi-party service.

* * * * *